US012739574B2

(12) United States Patent
Lovchinsky et al.

(10) Patent No.: US 12,739,574 B2
(45) Date of Patent: Sep. 15, 2026

(54) SPEECH BOOST FOR EAR-WORN DEVICE

(71) Applicant: Fortell Research Inc., New York, NY (US)

(72) Inventors: Igor Lovchinsky, New York, NY (US); Philip Meyers, IV, San Francisco, CA (US); Israel Malkin, Manhattan Beach, CA (US); Nicholas Morris, Brooklyn, NY (US)

(73) Assignee: Fortell Research Inc., New York, NY (US)

( * ) Notice: Subject to any disclaimer, the term of this patent is extended or adjusted under 35 U.S.C. 154(b) by 166 days.

(21) Appl. No.: 18/949,520

(22) Filed: Nov. 15, 2024

(65) Prior Publication Data

US 2025/0168571 A1 May 22, 2025

Related U.S. Application Data

(60) Provisional application No. 63/600,226, filed on Nov. 17, 2023.

(51) Int. Cl.
*H04R 25/00* (2006.01)

(52) U.S. Cl.
CPC .................................... *H04R 25/45* (2013.01)

(58) Field of Classification Search
CPC . G10L 21/02; G10L 21/0232; G10L 21/0216; G10L 21/0364; G10L 15/16;
(Continued)

(56) References Cited

U.S. PATENT DOCUMENTS 11,812,225 B2 11/2023 Casper et al.
2018/0184213 A1 6/2018 Lesimple et al.

FOREIGN PATENT DOCUMENTS

CN 115565544 * 1/2023
JP H09068997 3/1997

OTHER PUBLICATIONS

Y. Lai, et al., "Improving the Performance of Hearing Aids in Noisy Environments Based on Deep Learning Technology", 5 pages 2018 40th Annual International Conference of the IEEE Engineering in Medicine and Biology Society (EMBC), IEEE, Jul. 18, 2018, pp. 404-408.

(Continued)

*Primary Examiner* — Norman Yu
(74) *Attorney, Agent, or Firm* — Shih IP Law Group, PLLC

(57) ABSTRACT

An ear-worn device may include control circuitry configured to activate speech mode or traditional mode. Based on activation of speech mode, the control circuitry may be configured to control noise reduction circuitry to perform neural network-based noise reduction using neural network circuitry, and to control speech boost circuitry to automatically increase a volume of the audio signal at its output relative to the volume of the audio signal at its input, where the increase in the volume is in addition to any amplification applied by WDRC circuitry. Based on activation of traditional mode, the control circuitry may be configured to control the noise reduction circuitry to cease to perform the neural network-based noise reduction, and to control the speech boost circuitry to cease to automatically increase the volume of the audio signal at its output relative to the volume of the audio signal at its input.

28 Claims, 11 Drawing Sheets

(58) Field of Classification Search
CPC ......... G10L 25/84; G10L 25/78; G10L 15/20; G10L 21/0208; G10L 25/30; H04R 2225/43; H04R 2225/41; H04R 1/1083; H04R 2460/01; H04R 2430/01; H04R 25/356; H04R 25/45; H04R 25/507; H04R 25/558
USPC .... 381/23.1, 312, 317, 313, 314, 320, 71.11
See application file for complete search history.

(56) References Cited

OTHER PUBLICATIONS

International Search Report and Written Opinion from International Application No. PCT/US2024/056222 mailed Feb. 21, 2025, 11 pages.

* cited by examiner

SPEECH BOOST FOR EAR-WORN DEVICE

BACKGROUND

Field

The present disclosure relates to an ear-worn device, such as a hearing aid.

Related Art

Hearing aids are used to help those who have trouble hearing to hear better. Typically, hearing aids amplify received sound. Some hearing aids attempt to enhance incoming sound.

SUMMARY

Conventional hearing aids and other ear-worn devices such as cochlear implants and earphones may use conventional signal processing techniques to enhance audio signals, but such techniques typically provide only a limited amount of signal-to-noise ratio (SNR) improvement, beyond which further amplification of speech cannot be applied without applying additional amplification to the noise as well. Some conventional hearing aids may reduce overall amplification in a noisy environment such as a restaurant with significant non-stationary noise, since the background noise in the restaurant may otherwise be uncomfortably loud for the wearer.

Recently, ear-worn devices that run neural networks trained to denoise audio signals have been developed. Further description of such neural networks may be found in U.S. Pat. No. 11,812,225, titled “Method, apparatus and system for neural network hearing aid,” and issued on Nov. 7, 2023, the content of which is incorporated by reference herein in its entirety. Such neural network-based noise reduction may enable significantly larger improvements in SNR than conventional signal processing techniques may enable. The inventors have discovered that, when the wearer has selected a speech mode that implements neural network-based noise reduction, it may be helpful to bundle the neural network-based noise reduction with automatic volume increase, as implemented by speech boost circuitry. The inventors have realized that when the SNR can be improved by such a dramatic amount, the optimal gain applied to the combined signal (i.e., speech plus noise) may be much larger than might be applied when the signal has only been denoised with conventional signal processing techniques. A non-exhaustive description of reasons for why this may be helpful include: 1. The inventors have recognized that, perceptually, wearers of ear-worn devices may feel that louder speech is clearer speech; and 2. The inventors have recognized that typical fitting formulas (e.g., as implemented by wide dynamic range compression) may be premised on the assumption that speech and noise are being mapped into a new dynamic range. In other words, such formulas may be tuned to prevent too much loudness, knowing that both speech and noise will be amplified. If the ear-worn device is able to reduce noise such that mainly speech is amplified, more gain may be applied to the speech while maintaining equivalent loudness. In other words, the optimal amount of gain for an audio signal having only speech may be greater than for an audio signal having speech and noise; 3. The inventors have recognized that, since the neural network-based noise reduction may be able to realize drastically larger improvements in SNR (e.g., >10 dB, >20 dB, >30 dB), the optimal gain applied to the combined signal may be much larger than might be applied when the signal has only been denoised with conventional signal processing techniques. This is because in some cases, additional gain may be required for the wearer to experience the full SNR improvement that neural network-based denoising can provide. For example, for mild-to-moderate hearing losses, the tip of an ear-worn device in the wearer’s ear may allow in much of the ambient environmental noise, and the gain prescribed for the wearer’s hearing loss may be fairly low. In such environments, the “direct path” of environmental noise may limit the SNR that the wearer experiences at typical prescribed amplification levels, and the wearer may benefit from additional amplification applied to the speech so as to experience a higher SNR.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

The aspects and embodiments described above, as well as additional aspects and embodiments, are described further below. These aspects and/or embodiments may be used individually, all together, or in any combination of two or more, as the disclosure is not limited in this respect.

Figure 1:
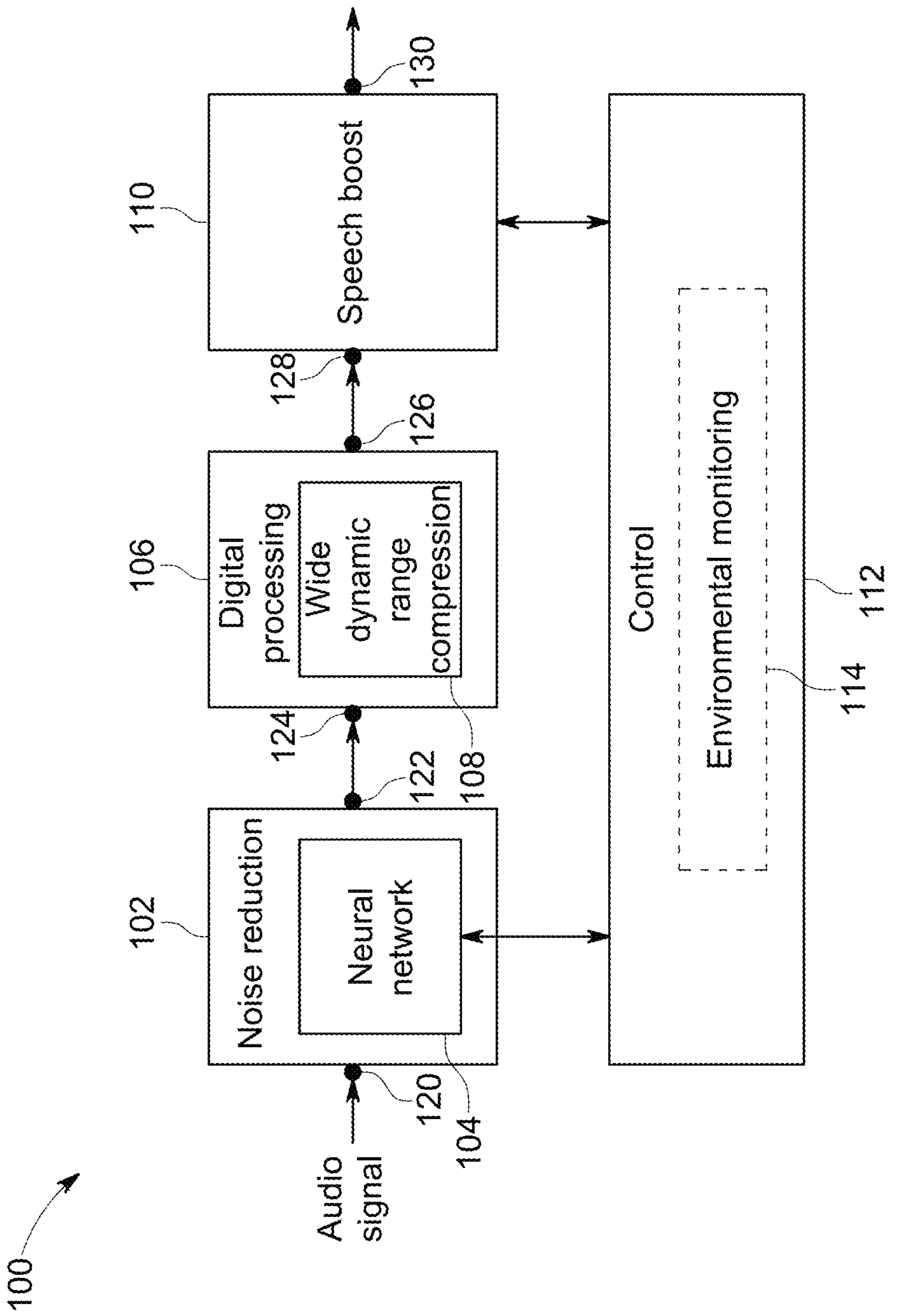
FIG. 1 illustrates circuitry in an ear-worn device, in accordance with certain embodiments described herein.

FIG. 1 illustrates circuitry in an ear-worn device 100 (e.g., a hearing aid, cochlear implant, earphone, etc.), in accordance with certain embodiments described herein. The circuitry in the ear-worn device 100 includes noise reduction circuitry 102, digital processing circuitry 106, speech boost circuitry 110, and control circuitry 112. The noise reduction circuitry 102 includes neural network circuitry 104 and has an input 120 and an output 122. The digital processing circuitry 106 includes wide dynamic range compression (WDRC) circuitry 108 and has an input 124 and an output

126. The speech boost circuitry 110 has an input 128 and an output 130. Optionally, the control circuitry 112 includes environmental monitoring circuitry 114, although in some embodiments, the environmental monitoring circuitry 114 may be included in the speech boost circuitry 110. (In some embodiments, the environmental monitoring circuitry 114 may be absent.) The digital processing circuitry 106 is coupled between the noise reduction circuitry 102 and the speech boost circuitry 110. As referred to herein, if element A is described as coupled between element B and element C, there may be other elements between elements A and B and/or between elements A and C. The control circuitry 112 is coupled to the noise reduction circuitry 102 and the speech boost circuitry 110. The noise reduction circuitry 102 receives an audio signal at its input 120, and the audio signal is then processed by the digital processing circuitry 106 and then by the speech boost circuitry 110. The audio signal received by the noise reduction circuitry 102 at its input 120 may be a processed version of an audio signal that enters the ear-worn device 100.

Figure 2:
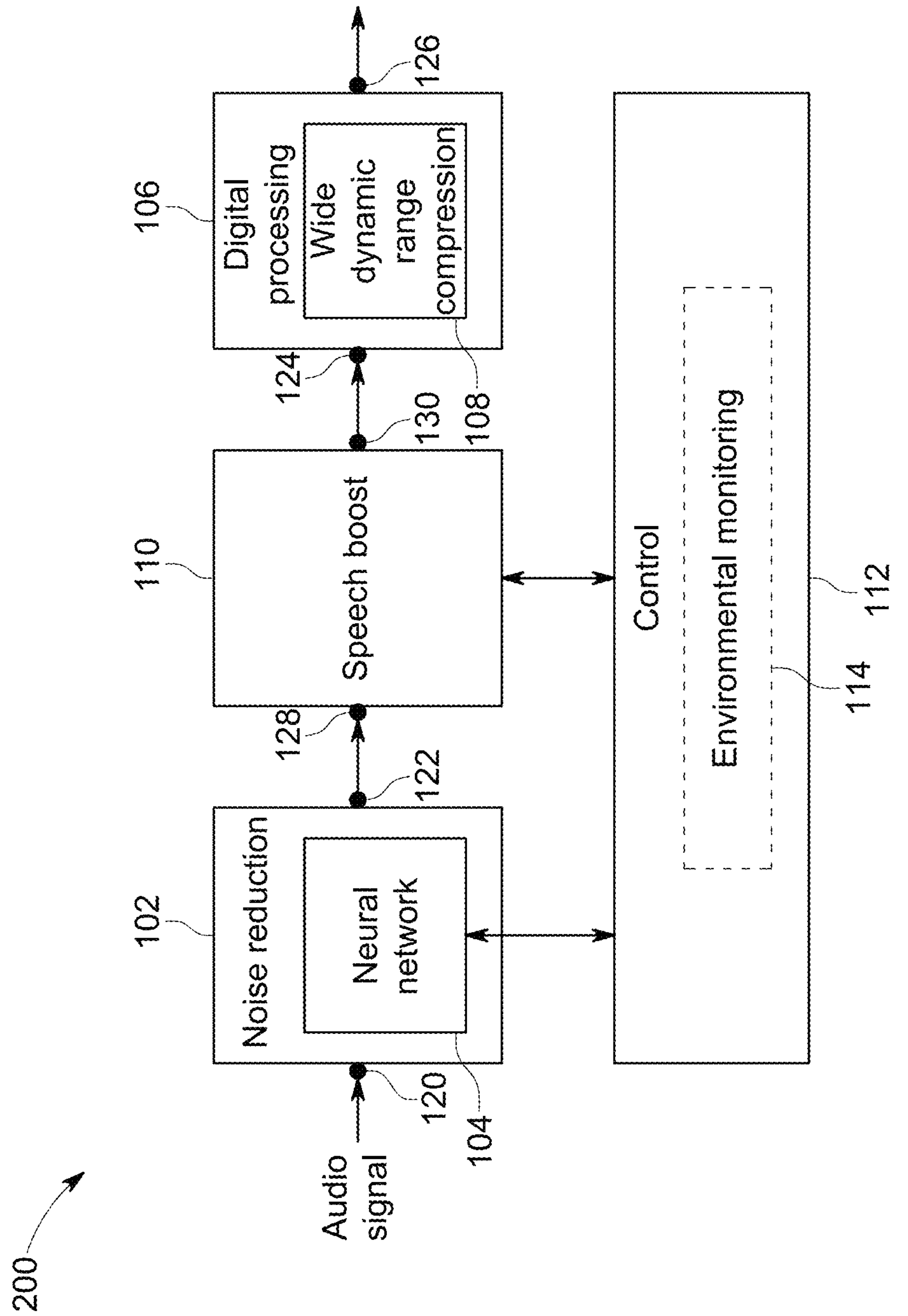
FIG. 2 illustrates circuitry in an ear-worn device, in accordance with certain embodiments described herein.

FIG. 2 illustrates circuitry in an ear-worn device 200 (e.g., a hearing aid, cochlear implant, earphone, etc.), in accordance with certain embodiments described herein. The circuitry in FIG. 2 is the same as the circuitry in FIG. 1, except that in FIG. 2, the speech boost circuitry 110 is coupled between the noise reduction circuitry 102 and the digital processing circuitry 106. The noise reduction circuitry 102 receives an audio signal at its input 120, and the audio signal is then processed by the speech boost circuitry 110 and then by the digital processing circuitry 106.

It should be appreciated that the ear-worn devices 100 and 200 may include more circuitry than illustrated in FIGS. 1 and 2, respectively. Such circuitry may be disposed upstream, downstream, or between certain of the circuitry illustrated in FIGS. 1 and 2. For example, in some embodiments microphones, analog processing circuitry, and digital processing circuitry may be disposed upstream of the circuitry illustrated in FIGS. 1 and 2. This upstream circuitry may be configured to process the audio signal entering the ear-worn device 100 or 200 to produce the audio signal received by the noise reduction circuitry 102 at its input 120. In some embodiments, digital processing circuitry and a receiver may be disposed downstream of the circuitry illustrated in FIGS. 1 and 2. It should also be appreciated that the control circuitry 112 may be coupled to and configured to control other circuitry, such as the digital processing circuitry 106.

The neural network circuitry 104 in the noise reduction circuitry 102 may be configured to implement a neural network (or generally, one or more neural network layers) trained to perform noise reduction on the audio signal received by the noise reduction circuitry 102 at its input 120. Thus, the audio signal output by the noise reduction circuitry 102 at its output 122 may be a noise-reduced version of the audio signal received by the noise reduction circuitry 102 at its input 120. The noise reduction circuitry 102 may be configured to use the neural network circuitry 104 to isolate a speech component of the audio signal from a noise component of the audio signal, attenuate the noise component, and combine the speech component and the attenuated noise component together as an output audio signal. In other words, the noise reduction circuitry 102 may be configured to enhance speech in the audio signal. Through this process, the noise reduction circuitry 102 may be able to improve the signal-to-noise ratio (SNR) to much larger degrees than can be achieved using conventional signal processing techniques. In some embodiments, the SNR improvement may be more than 10 dB. In some embodiments, the SNR improvement may be more than 20 dB. In some embodiments, the SNR improvement may be more than 30 dB.

Any neural network layers described herein may be, for example, of the recurrent, vanilla/feedforward, convolutional, generative adversarial, attention (e.g. transformer), or graphical type. Generally, a neural network made up of such layers may include an input layer, a plurality of intermediate layers, and an output layer, and the layers may be made up of a plurality of neurons/nodes to which neural network weights can be applied.

The digital processing circuitry 106 may be configured to use the WDRC circuitry 108 to apply level- and frequency-dependent gains to the audio signal received by the WDRC circuitry 108 while implementing compression, such that the dynamic range of the output audio signal is smaller than the dynamic range of the input audio signal. The level- and frequency-dependent gains may be based on fitting formulas, which in some cases may be specific to the wearer's hearing loss.

The speech boost circuitry 110 may be configured to increase the volume of the audio signal at the output 130 of the speech boost circuitry 110 relative to the volume of the audio signal at the input 128 of the speech boost circuitry 110. The increase in volume applied by the speech boost circuitry 110 may be in addition to any amplification provided by the WDRC circuitry 108. The amount of the volume increase (i.e., the amount by which the volume of the audio signal at the output 130 of the speech boost circuitry 110 is greater than the volume of the audio signal at the input 128 of the speech boost circuitry 110) may be referred to as the speech boost amount. In the circuitry of FIG. 1, the speech boost circuitry 110 increases the volume after the audio signal is processed by the WDRC circuitry 108. In the circuitry of FIG. 2, the speech boost circuitry 110 increases the volume before the audio signal is processed by the WDRC circuitry 108.

The control circuitry 112 may be configured to receive a selection of a speech mode or a selection of a traditional mode from the wearer of the ear-worn device 100 or 200. For example, the control circuitry 112 may be configured to receive the selection from the wearer based on the wearer pressing a button on the ear-worn device 100 or 200, which may toggle between the two modes. As another example, the control circuitry 112 may be configured to receive the selection from the wearer based on the wearer selecting an option displayed on a processing device (e.g., a smartphone or a tablet) in operative communication with the ear-worn device 100 or 200. Speech mode may include neural network-based noise reduction (or, equivalently, neural network-based speech enhancement), while traditional mode might not include network-based noise reduction. As will be described below, traditional mode may include other types of noise reduction based on conventional signal processing techniques that may not be as effective as neural network-based noise reduction.

The inventors have discovered that it may be helpful to bundle neural network-based noise reduction (as performed by the noise reduction circuitry 102 using the neural network circuitry 104) and automatic volume increase (as performed by the speech boost circuitry 110) in speech mode. Thus, based on the control circuitry 112 receiving a selection of speech mode from the wearer of the ear-worn device, the control circuitry 112 may be configured both (1) to control the noise reduction circuitry 102 to perform neural network-based noise reduction on the audio signal received by the noise reduction circuitry 102 using the neural network circuitry 104, and (2) to control the speech boost circuitry 110 to automatically increase the volume of the audio signal at its output 130 relative to the volume of the audio signal at its input 128. The increase in volume applied by the speech boost circuitry 110 may be in addition to any amplification provided by the WDRC circuitry 108. Based on the control circuitry 112 receiving a selection of traditional mode from the wearer of the ear-worn device, the control circuitry 112 may be configured both (1) to control the noise reduction circuitry 102 to cease to perform neural network-based noise reduction on the audio signal received by the noise reduction circuitry 102 using the neural network circuitry 104, and (2) to control the speech boost circuitry 110 to cease to automatically increase the volume of the audio signal at its output 130 relative to the volume of the audio signal at its input 128. In other words, if traditional mode was selected and then speech mode was selected, the control circuitry 112 may be configured to cause the noise reduction circuitry 102 to begin to perform neural network-based noise reduction on the audio signal received by the noise reduction circuitry 102, and automatically cause the speech boost circuitry 110 to begin to increase the volume of the audio signal at its output 130 relative to the volume of the audio signal at its input 128. If speech mode was selected and then traditional mode was selected, the control circuitry 112 may be configured to cause the noise reduction circuitry 102 to cease performing neural network-based noise reduction on the audio signal received by the noise reduction circuitry 102, and cause the speech boost circuitry 110 to cease automatically increasing the volume (or, equivalently, reduce the volume) of the audio signal at its output 130 relative to the volume of the audio signal at its input 128.

It should be appreciated that the noise reduction circuitry 102 may be configured to perform other types of noise reduction in addition to neural network-based noise reduction (e.g., using conventional signal processing techniques). In some embodiments, such noise reduction may be performed both in speech mode and traditional mode. In some embodiments, such noise reduction may be performed in speech mode but not in traditional mode.

It should also be appreciated that while the volume of the audio signal at the output 130 of the speech boost circuitry 110 may be higher than the volume of the audio signal at the input 128 of the speech boost circuitry 110 in speech mode, because of the noise reduction implemented by the noise reduction circuitry 102, the volume of the audio signal at the output 130 of the speech boost circuitry 110 may or may not be higher than the volume of the audio signal at the input 120 of the noise reduction circuitry 102 in speech mode. However, it should be appreciated that the volume of the speech component of the audio signal at the output 130 of the speech boost circuitry 110 may always be larger than the volume of the speech component of the audio signal at the input 120 to the noise reduction circuitry 102 in speech mode, in some embodiments.

It should also be appreciated that the volume increase applied by the speech boost circuitry 110 is automatic. Thus, the increase in volume applied by the speech boost circuitry 110 is not controlled by any dedicated manual volume control on the ear-worn device 100 or 200, nor by any dedicated manual volume control on a processing device (e.g., a smartphone or tablet) in operative communication with the ear-worn device 100 or 200. Rather, the ear-worn device 100 or 200 may apply the volume increase automatically based on receiving a selection of speech mode. If the wearer selects speech mode, the speech boost circuitry 110 may automatically increase the volume by the speech boost amount, and if the wearer then selects traditional mode, the speech boost circuitry 110 may automatically cease to increase the volume by the speech boost amount. Thus, the volume may increase or decrease without the wearer manipulating any dedicated manual volume controls. Generally, the increase in volume applied by the speech boost circuitry 110 may be independent of a user-controllable dedicated volume input.

As described above, in some embodiments a button, dial, or other physical input device on the ear-worn device may control whether speech mode or traditional mode is activated. In such embodiments, the ear-worn device may be part of a system that includes a physical, manual volume control that is different from the button. For example, the ear-worn device may be a hearing aid in a system of two hearing aids, and one hearing aid may have the button, dial, or other physical input device controlling whether speech mode or traditional mode is activated on both hearing aids, and the other hearing aid may have a button, dial, or other physical input device (or multiple thereof) providing manual control of volume on both hearing aids. The hearing aids may be configured to communicate with each other over a wireless communication link such that activation of a user input device on one hearing aid may be communicated to the other hearing aid.

Figure 3:
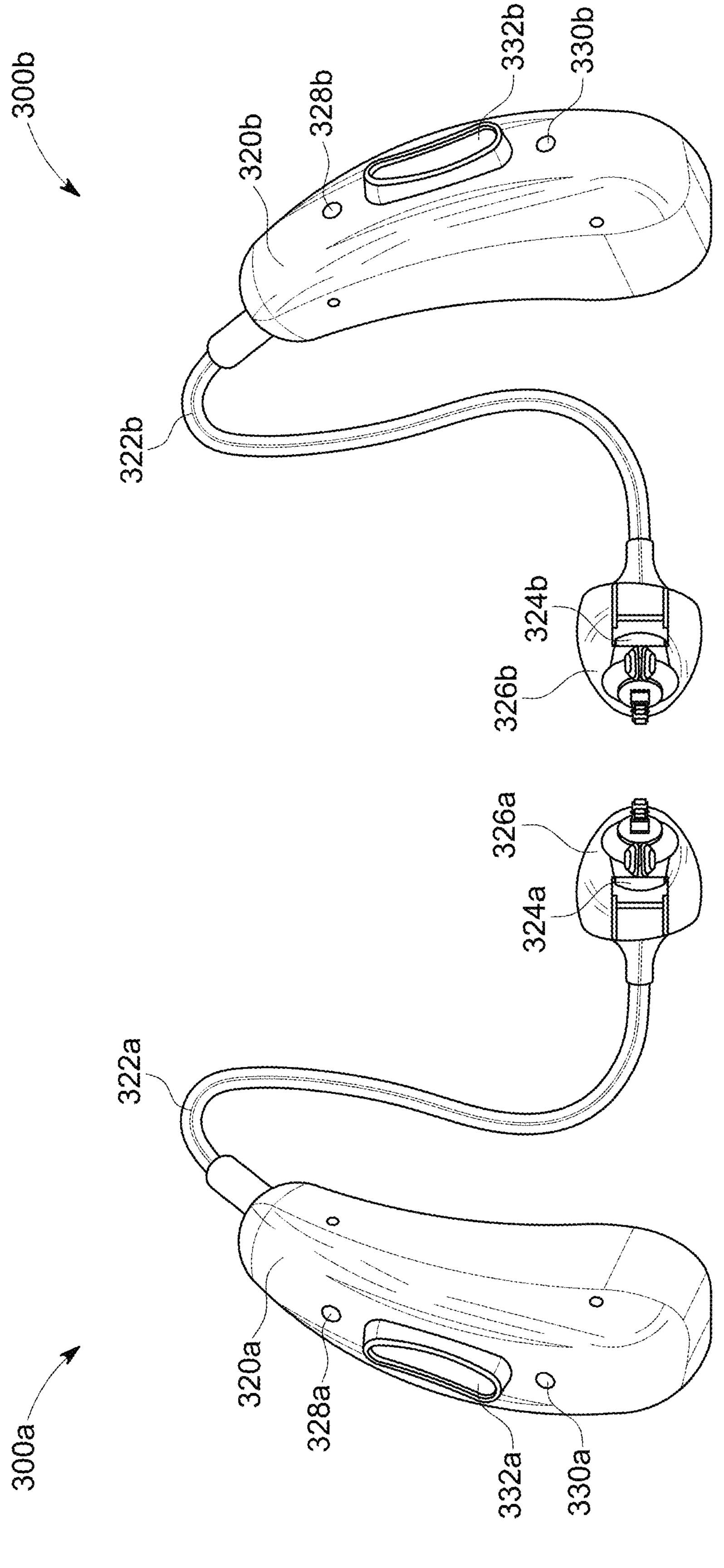
FIG. 3 illustrates a system of two hearing aids, in accordance with certain embodiments described herein.

FIG. 3 illustrates a system of two hearing aids, a hearing aid **300*a* and a hearing aid 300*b*, in accordance with certain embodiments described herein. The hearing aids 300*a* and 300*b* may correspond to any of the ear-worn devices described herein, such as the ear-worn devices 100, 200, or 1000. Each of the hearing aids 300*a* and 300*b* may be configured to be worn on one ear of a wearer. Each of the hearing aids 300*a* and 300*b* is a receiver-in-canal (RIC) (also referred to as a receiver-in-the-ear (RITE)) type of hearing aid. However, any other type of hearing aid (e.g., behind-the-ear, in-the-ear, in-the-canal, completely-in-canal, open fit, etc.) may also be used. The hearing aid 300*a* includes a body 320*a*, a receiver wire 322*a*, a receiver 324*a*, and a dome 326*a*. The body 320*a* is coupled to the receiver wire 322*a* and the receiver wire 322*a* is coupled to the receiver 324*a*. The dome 326*a* is placed over the receiver 324*a*. The body 320*a* includes a front microphone 328*a*, a back microphone 330*a*, and a button 332*a*. The body 320*a* additionally includes circuitry (e.g., any of the circuitry described hereinafter, aside from the receiver 324*a*) not illustrated in FIG. 3. When the hearing aid 300*a* is worn, the front microphone 328*a* may be closer to the front of the wearer and the back microphone 330*a* may be closer to the back of the wearer. The front microphone 328*a* and the back microphone 330*a* may be configured to receive sound signals and generate audio signals based on the sound signals. The receiver wire 322*a* may be configured to transmit audio signals from the body 320*a* to the receiver 324*a*. The receiver 324*a* may be configured to receive audio signals (i.e., those audio signals generated by the body 320*a* and transmitted by the receiver wire 322*a*) and generate sound signals based on the audio signals. The dome 326*a* may be configured to fit tightly inside the wearer's ear and direct the sound signal produced by the receiver 324*a* into the ear canal of the wearer. In some embodiments, the length of the body 320*a* may be equal to 2 cm, equal to 5 cm, or between 2 and 5 cm in length. In some embodiments, the weight of the hearing aid 300*a* may be less than 4.5 grams. In some embodiments, the spacing between the microphones may be equal to 5 mm, equal to 12 mm, or between 5 and 12 mm. In some embodiments, the body 320*a* may include a battery (not visible in FIG. 3), such as a lithium ion rechargeable coin cell battery. The above description of the hearing aid 300***a*, the body 320*a*, the receiver wire 322*a*, the receiver 324*a*, the dome 326*a*, the front microphone 328*a*, and the back microphone 330*a* also applies to the hearing aid 300*b*, the body 320*b*, the receiver wire 322*b*, the receiver 324*b*, the dome 326*b*, the front microphone 328*b*, and the back microphone 330*b*, respectively.

In some embodiments, the button 332*a* on the hearing aid 300*a* may be configured to control whether speech mode or traditional mode is activated on both of the hearing aids 300*a* and 300*b*, and the button 332*b* on the hearing aid 300*b* may be configured for manually controlling volume on both of the hearing aids 300*a* and 300*b*. In some embodiments, the button 332*b* on the hearing aid 300*b* may be configured to control whether speech mode or traditional mode is activated on both of the hearing aids 300*a* and 300*b*, and the button 332*a* on the hearing aid 300*a* may be configured for manually controlling volume on both of the hearing aids 300*a* and 300*b*.

Figure 4:
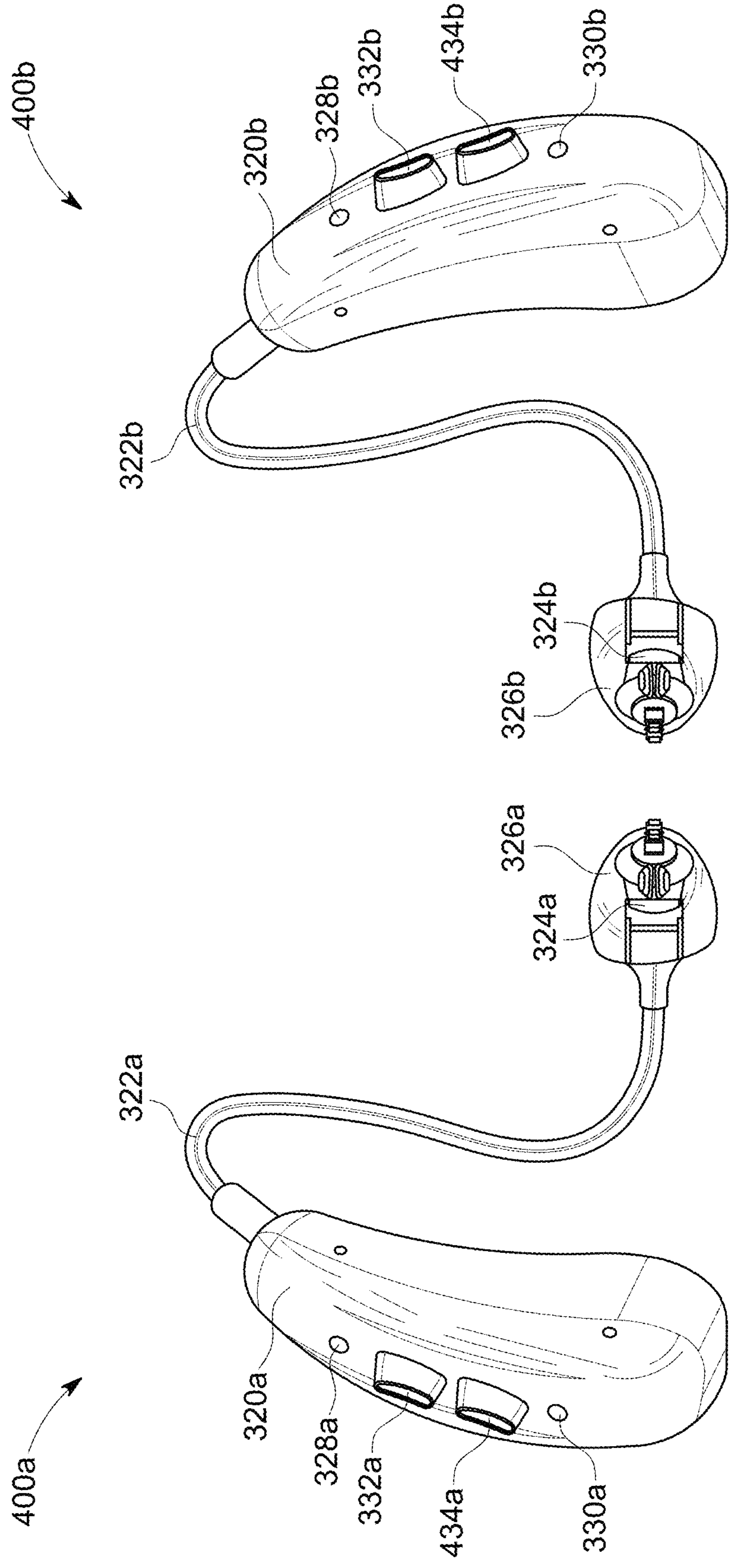
FIG. 4 illustrates a system of two hearing aids, in accordance with certain embodiments described herein.

As another example of input devices, each ear-worn device in a system of two hearing aids may have a button, dial, or other physical input device controlling whether speech mode or traditional mode is activated and another button, dial, or other physical input device (or multiple thereof) providing manual control of volume. FIG. 4 illustrates a system of two hearing aids, a hearing aid 400*a* and a hearing aid 400*b*, in accordance with certain embodiments described herein. The hearing aids 400*a* and 400*b* may correspond to any of the ear-worn devices described herein, such as the ear-worn devices 100, 200, or 1000. The above description of the hearing aids 300*a* and 300*b* may apply to the hearing aids 400*a* and 400*b*, except that the hearing aid 400*a* includes a button 332*a* and a button 434*a*, and the hearing aid 300*b* includes a button 332*b* and a button 434*b*. In some embodiments, the button 332*a* on the hearing aid 300*a* may be configured to control whether speech mode or traditional mode is activated on the hearing aid 300*a*, and the button 434*a* on the hearing aid 300*a* may be configured for manually controlling volume on the hearing aid 300*a*. In some embodiments, the button 434*a* on the hearing aid 300*a* may be configured to control whether speech mode or traditional mode is activated on the hearing aid 300*a*, and the button 332*a* on the hearing aid 300*a* may be configured for manually controlling volume on the hearing aid 300*a*. In some embodiments, the button 332*b* on the hearing aid 300*b* may be configured to control whether speech mode or traditional mode is activated on the hearing aid 300*b*, and the button 434*b* on the hearing aid 300*b* may be configured for manually controlling volume on the hearing aid 300*b*. In some embodiments, the button 434*b* on the hearing aid 300*b* may be configured to control whether speech mode or traditional mode is activated on the hearing aid 300*b*, and the button 332*b* on the hearing aid 300*b* may be configured for manually controlling volume on the hearing aid 300*b*. In some embodiments, hearing aids (or ear-worn devices in general) may have other types of user input devices besides buttons. In some embodiments, each of the buttons 332*a*, 332*b*, 434*a*, and/or 434*b* may be replaced by multiple buttons (or generally, multiple user input devices). For example, multiple buttons may be used for manual control of volume, such as one button to increase volume and one button to decrease volume.

Figure 5:
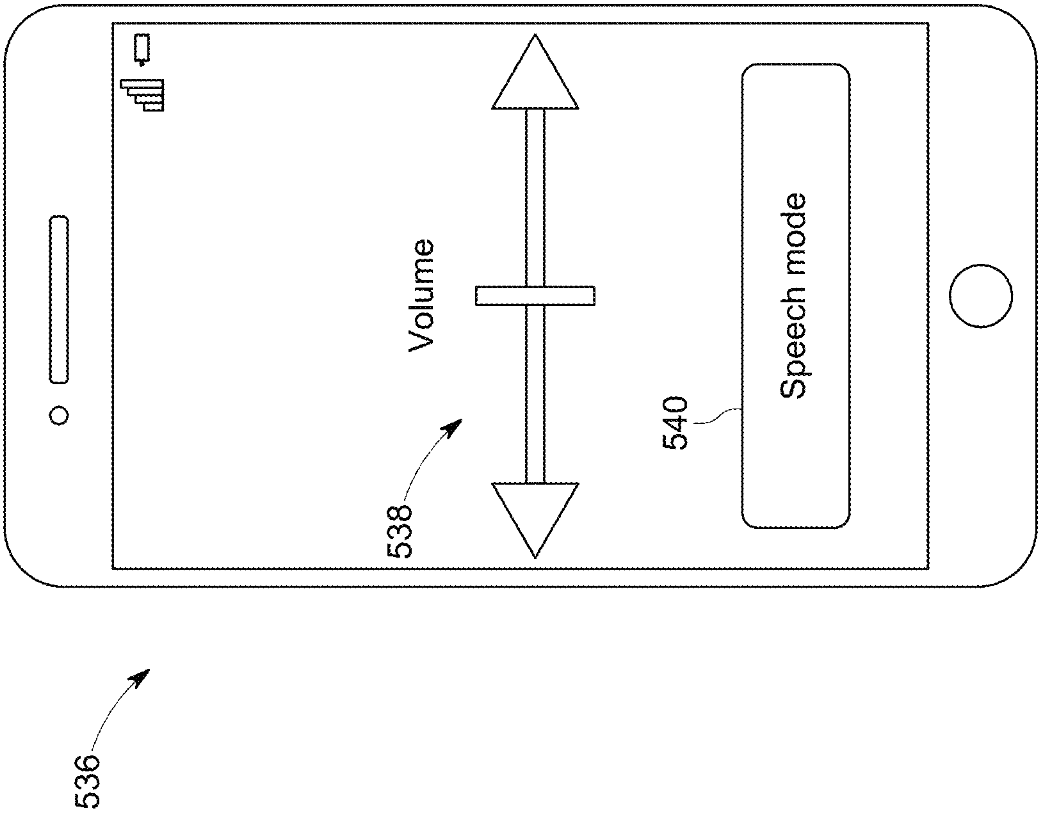
FIG. 5 illustrates an example graphical user interface (GUI), in accordance with certain embodiments described herein.

As described above, in some embodiments an option may be displayed by a processing device in operative communication with the ear-worn device to allow control of whether speech mode or traditional mode is activated. In such embodiments, the processing device may display a manual volume control that is different from the option. For example, the processing device may display two options, one controlling whether speech mode or traditional mode is activated, and one providing manual control of volume. FIG. 5 illustrates an example graphical user interface (GUI) 536, in accordance with certain embodiments described herein. The GUI 536 may be displayed on a processing device in communication with one or more ear-worn devices over one or more wireless communication links. The GUI 536 includes an option 538 for manual volume control and an option 540 for controlling whether speech mode or traditional mode is activated. It should be appreciated that other forms for the options 538 and 540 may be used. For example, while FIG. 5 displays a slider for the option 538, other forms such as a wheel may be used instead. As another example, while FIG. 5 displays one option 540 for toggling between speech mode and traditional mode, separate options for selecting each mode may be used instead.

Following is a non-exhaustive description of reasons for why bundling neural network-based noise reduction and volume increase in a single mode may be helpful: 1. The inventors have recognized that perceptually, wearers of ear-worn devices may feel that louder speech is clearer speech 2. The inventors have recognized that typical fitting formulas (e.g., as implemented by WDRC) may be premised on the assumption that speech and noise are being mapped into a new dynamic range. In other words, such formulas may be tuned to prevent too much loudness, knowing that both speech and noise will be amplified. If the ear-worn device is able to reduce noise such that mainly speech is amplified, more gain may be applied to the speech while maintaining equivalent loudness. In other words, the optimal amount of gain for an audio signal having only speech may be greater than for an audio signal having speech and noise 3. The inventors have recognized that since the noise reduction circuitry 102 may be capable of using a neural network to realize drastic improvements in SNR (e.g., >10 dB, >20 dB, >30 dB), the optimal gain applied to the combined signal (i.e., as implemented by the WDRC circuitry 108) may be much larger than might be applied when the signal is still noisy. For example, for wearers with mild hearing loss, the prescribed amount of gain may be quite low. If the amount of noise attenuation is greater than the amount of gain, then the volume of the noise heard by the wearer may be set by the direct path of the audio (i.e., the path of noise directly from the environment into the ear of the wearer) rather than the amplified path (i.e., the path of noise from the environment into the ear-worn device, and from the ear-worn device into the ear of the wearer).

Figure 6:
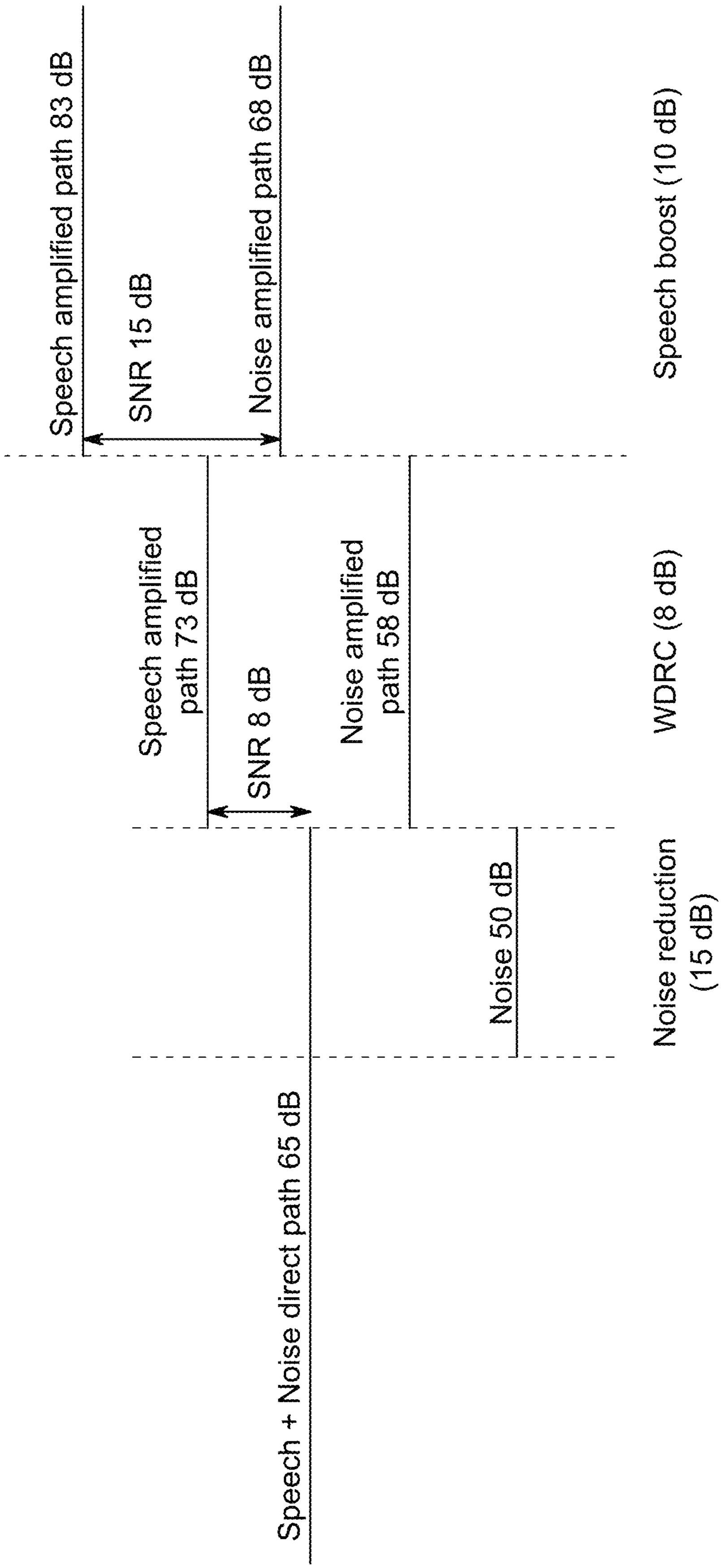
FIG. 6 illustrates an example of speech mode, in accordance with certain embodiments described herein.

FIG. 6 illustrates an example of speech mode, in accordance with certain embodiments described herein. As described above, in speech mode, neural network-based noise reduction and speech boost may be performed in addition to WDRC. In this example, the volume of both speech and noise in the input audio from the direct path is 65 dB. In other words, SNR is initially 0 dB. Noise reduction separates the speech component from the noise component of the input audio and reduces the noise component by 15 dB (in this example), to 50 dB. WDRC then amplifies the combined speech and (reduced) noise components by 8 dB (in this example), such that the speech component is amplified to 73 dB and the noise component is amplified to 58 dB. As experienced by the wearer, the SNR may be 8 dB, as the speech volume is 8 dB higher than the noise volume set by the direct path, which is higher than the volume of the noise in the amplified path. It should be appreciated that while the noise reduction method may have the ability to improve the SNR for the wearer by 15 dB in this example, the wearer may only experience 8 dB of improvement with just noise reduction and WDRC. It may therefore be helpful to use speech boost (i.e., as implemented by the speech boost circuitry 110) to increase the volume of the speech and noise in the amplified path by some additional amount so that the wearer experiences a larger SNR improvement. In this example, speech boost of 10 dB may raise the volume of the speech in the amplified path to 83 dB and raise the volume of the noise in the amplified path to 68 dB. As experienced by the wearer, the SNR may be 15 dB, as the speech volume is 15 dB higher than the noise volume set by the amplified path, which is higher than the volume of the noise in the direct path. Thus, the speech boost may enable the wearer to experience a higher SNR.

Figure 7:
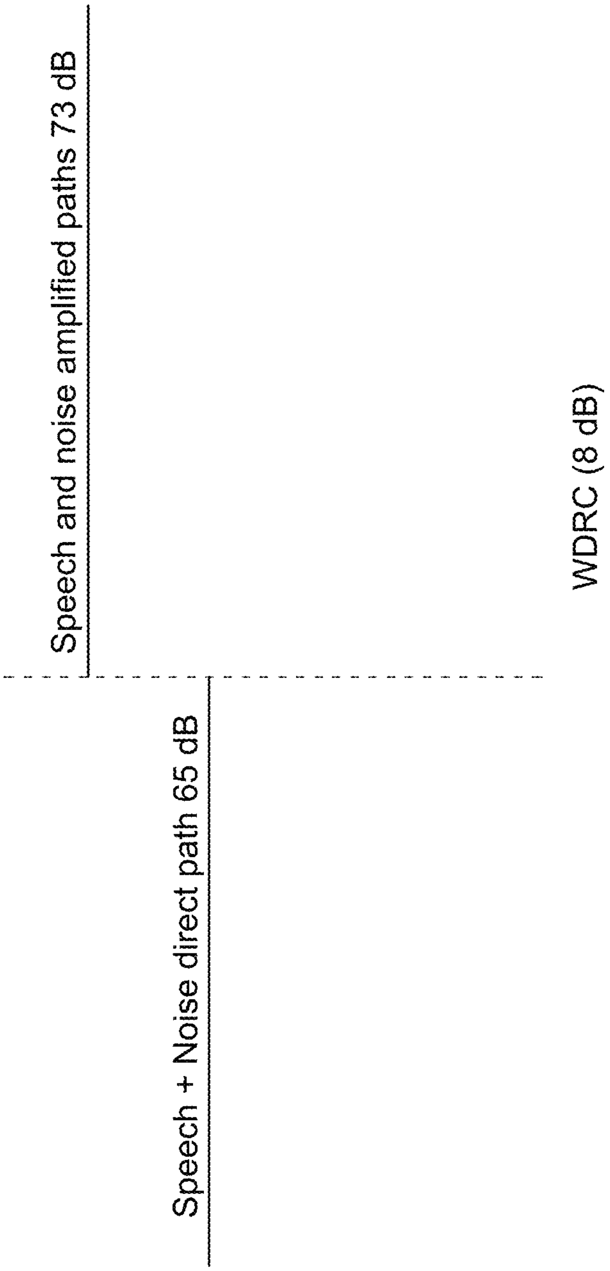
FIG. 7 illustrates an example of traditional mode, in accordance with certain embodiments described herein.

FIG. 7 illustrates an example of traditional mode, in accordance with certain embodiments described herein. As described above, in traditional mode, neural network-based noise reduction and speech boost might not be performed, but WDRC may still be performed. FIG. 7 may otherwise illustrate the same scenario as in FIG. 6, such that the speech and noise direct paths are at the same levels in FIGS. 6 and 7. In FIG. 7, the WDRC increases the volume of both speech and noise by 8 dB. It should be appreciated that, assuming all WDRC parameters remain the same, the speech component of the audio signal may always increase in volume when speech boost is activated versus when speech boost is not activated. Thus, in FIG. 6, the speech amplified path is at 83 dB, but in FIG. 7 the speech amplified path is at 73 dB. It should also be appreciated that, as described above, the volume increase applied by the speech boost circuitry 110 is in addition to any amplification applied by the WDRC circuitry 108. Thus, in FIG. 6, the speech boost of 10 dB is in addition to the WDRC amplification of 8 dB. Thus, in some embodiments, one may detect whether speech boost is being implemented by speech boost circuitry 110 by toggling between speech mode and traditional mode while maintaining speech direct path level and WDRC parameters constant, and determining whether the speech component of the audio signal at the output of the ear-worn device is higher in speech mode versus traditional mode. However, it should be appreciated that this may not be a necessary method for detecting whether speech boost is being implemented, and there may be other methods for detection as well.

Following is a description of various methods that the control circuitry 112 may use to determine by how much to increase the volume of the audio signal at the output 130 of the speech boost circuitry 110 relative to the volume of the audio signal at the input 128 of the speech boost circuitry 110 (i.e., the speech boost amount). In some embodiments, the control circuitry 112 may be configured to control the speech boost circuitry 110 to set the speech boost amount to either (1) the prescribed WDRC gain in quiet (i.e., the gain that would be derived from just the speech signal), or (2) the amount of neural-network based noise reduction multiplied by a constant, whichever is greater, minus an estimate of tip attenuation. (Tip attenuation may refer to attenuation that the tip of the ear-worn device in the ear canal of the wearer applies to the direct path. It may be estimated in an ear simulator by measuring the difference between the volume in the ear simulator with nothing in the ear and the volume with the tip fit in the ear with no amplification (hearing aid muted). This may be done at different frequencies as tip attenuation may be frequency dependent.) This may ensure that the wearer always experiences a minimum SNR. For example, if the noise reduction circuitry 102 is capable of reducing noise by 20 dB, the constant is 0.75, the prescribed WDRC gain in quiet is less than 15 dB, and the tip will attenuate the direct path by 2 dB, then the speech boost amount may be 13 dB in gain and the wearer may always experience an SNR improvement of equal to or approximately 15 dB. As another example, if the noise reduction circuitry 102 is capable of reducing noise by 20 dB, the constant is 1, the prescribed WDRC gain in quiet is less than 20 dB, and the tip will attenuate the direct path by 2 dB, then the speech boost amount may be 18 dB in gain and the wearer may always experience an SNR improvement of equal to or approximately 20 dB. In some embodiments, the amount of noise reduction on speech mode may be configurable and thus the amount of speech boost applied may vary according to the configuration of the noise reduction. In some embodiments, the speech boost amount may be either (1) the prescribed WDRC gain in quiet, or (2) the amount of neural-network based noise reduction multiplied by a constant, whichever is greater, without consideration of tip attenuation. In some embodiments, the speech boost amount may be the amount of neural-network based noise reduction multiplied by a constant, regardless of the prescribed WDRC gain in quiet. In some embodiments, the speech boost amount may be the amount of neural-network based noise reduction multiplied by a constant minus an estimate of the tip attenuation, regardless of the prescribed WDRC gain in quiet.

In some embodiments, the control circuitry 112 may be configured to use the environmental monitoring circuitry 114 to estimate the direct path noise level. In such embodiments, the control circuitry 112 may be configured to control, based on the estimated direct path noise level, the speech boost circuitry 110 to automatically increase the volume of the audio signal at its output 130 relative to the volume of the audio signal at its input 128 by a speech boost amount, where the speech boost amount is larger in a louder environment and smaller in a quieter environment. Thus, a first speech boost amount applied at a first time may be larger than a second speech boost amount applied at a second time when the environment is louder at the first time than at the second time. In some embodiments, the control circuitry 112 may be configured to control, based on the estimated direct path noise level, the speech boost circuitry 110 to automatically increase the volume of the audio signal at its output 130 relative to the volume of the audio signal at its input 128 by a speech boost amount, where the speech boost amount is smaller in a louder environment and larger in a quieter environment. Thus, a first speech boost amount applied at a first time may be larger than a second speech boost amount applied at a second time when the environment is louder at the second time than at the first time.

In some embodiments, the control circuitry 112 may be configured to use the environmental monitoring circuitry 114 to estimate the direct path noise level and a direct path speech level, from both of which SNR can be estimated. In such embodiments, the control circuitry 112 may be configured to control, based on the estimated direct path noise level and the estimated direct path speech level, the speech boost circuitry 110 to automatically increase the volume of the audio signal at its output 130 relative to the volume of the audio signal at its input 128 by a speech boost amount, where the speech boost amount is larger in a lower SNR environment and smaller in a higher SNR environment. Thus, a first speech boost amount applied at a first time may be larger than a second speech boost amount applied at a second time when the environment has a lower SNR at the first time than at the second time. In some embodiments, the control circuitry 112 may be configured to control, based on the estimated direct path noise level and the estimated direct path speech level, the speech boost circuitry 110 to automatically increase the volume of the audio signal at its output 130 relative to the volume of the audio signal at its input 128 by a speech boost amount, where the speech boost amount is smaller in a lower SNR environment and larger in a higher SNR environment. Thus, a first speech boost amount applied at a first time may be larger than a second speech boost amount applied at a second time when the environment has a lower SNR at the second time than at the first time.

In some embodiments, the control circuitry 112 may be configured to use the environmental monitoring circuitry 114 to directly estimate an environmental SNR. In such embodiments, the control circuitry 112 may be configured to control, based on the estimated SNR, the speech boost circuitry 110 to automatically increase the volume of the audio signal at its output 130 relative to the volume of the audio signal at its input 128 by a speech boost amount, where the speech boost amount is larger in a lower SNR environment and smaller in a higher SNR environment. Thus, a first speech boost amount applied at a first time may be larger than a second speech boost amount applied at a second time when the environment has a lower SNR at the first time than at the second time. In some embodiments, the control circuitry 112 may be configured to control, based on the estimated SNR, the speech boost circuitry 110 to automatically increase the volume of the audio signal at its output 130 relative to the volume of the audio signal at its input 128 by a speech boost amount, where the speech boost amount is smaller in a lower SNR environment and larger in a higher SNR environment. Thus, a first speech boost amount applied at a first time may be larger than a second speech boost amount applied at a second time when the environment has a lower SNR at the second time than at the first time.

In some embodiments, the control circuitry 112 may be configured to control the speech boost circuitry 110 to set the speech boost amount such that the speech component of the audio signal at the output of the speech boost circuitry is at least a certain amount louder than the direct path noise level of the audio signal. In such embodiments, the control circuitry 112 may be configured to use the environmental monitoring circuitry 114 to estimate the direct path noise level, and then control, based on the estimated direct path noise level, the speech boost circuitry 110 to automatically increase the volume of the audio signal at its output 130 relative to the volume of the audio signal at its input 128 by a speech boost amount such that a speech component of the audio signal at its output 130 is at least a certain amount louder than the estimated direct path noise level.

For example, returning to FIG. 6, assume that the speech boost circuitry 110 is configured to set the speech boost amount such that the speech level is 18 dB above the direct path noise level. The environmental monitoring circuitry 114 may estimate the direct path speech and noise levels to be 65 dB (i.e., SNR of 0 dB), and the speech boost circuitry 110 may then set the speech boost amount to 10 dB such that the speech level (after the prescribed 8 dB amplification during WDRC and 10 dB amplification during speech boost) is 83 dB, or 18 dB above the direct path noise level of 65 dB. If the environmental monitoring circuitry 114 estimated the direct path speech level to be 65 dB and the noise level to be 60 dB (i.e., SNR of 5 dB), then the speech boost circuitry may set the speech boost amount to 5 dB such that the speech level (after the prescribed 8 dB amplification during WDRC and 5 dB amplification during speech boost) is 78 dB, or 18 dB above the direct path noise level of 60 dB.

To estimate the direct path speech and noise levels, the environmental monitoring circuitry 114 may be configured to estimate the power of the speech and noise components of the audio signal once the components have been separated using the noise reduction circuitry 102. It should be appreciated that in ear-worn devices that lack microphones in the ear canal of the wearer, it may not be possible to directly measure the direct path level of speech or noise. Thus, the ear-worn device may only be able to estimate such direct path levels, and may do so by measuring the levels of the speech and noise in an audio signal as picked up by the ear-worn device's microphones, and then applying a transfer function to convert the measured levels to direct path levels. The transfer function may capture mathematically the difference in sound level from the ear-worn device's microphone to the wearer's ear canal, both due to tip attenuation and the difference in location.

In some embodiments, the control circuitry 112 may be configured to control the speech boost circuitry 110 to amplify volume equally across all frequencies within an operating range of the device 100. (As one non-limiting example, the operating range of the device 100 may be approximately 250-12,000 Hz. As another non-limiting example, the operating range of the device 100 may be approximately 5-21,000 Hz.) In some embodiments, the control circuitry 112 may be configured to control the speech boost circuitry 110 to implement a constant increase in insertion gain across all frequencies. This may in turn require the speech boost circuitry 110 to implement non-linear changes in amplification. For example, a prescription for mild hearing loss may include programming the WDRC circuitry 108 to implement amplification at high frequencies but not at low frequencies. This may be because the volume of the direct path at low frequencies may be sufficiently audible to the wearer. If the target insertion gain at low frequencies is zero, the WDRC circuitry 108 may be programmed to attenuate the amplified path further (i.e., below 0 dB) to avoid creating a comb filter in the low frequencies. A comb filter may occur if the direct path and the amplified path are at similar volumes but slightly delayed from one another, and may cause unpleasant sound artifacts for the wearer. Thus, the hearing aid may be programmed to attenuate the amplified part further at low frequencies to avoid a comb filter. If the speech boost circuitry 110 were to add further gain equally across all frequencies, this may lead to a non-linear change in insertion gain across the frequencies, as the additional amplification at high frequencies may be easily audible to the user while the additional amplification at low frequencies may remain below the direct path level. In other words, the resulting insertion gain vs. frequency curve may not have the same shape. Thus, the control circuitry 112 may be configured to control the speech boost circuitry 110 to add more gain in low frequencies than at the high frequencies. This may maintain a consistent spectral shaping for the wearer. For example, the control circuitry may be configured to control the speech boost circuitry to add a first gain in a first frequency range and a second gain in a second frequency range, wherein the first gain is higher than the second gain and the first frequency range is at lower frequencies than the second frequency range. (As one non-limiting example, the first frequency range may be approximately 250-1000 Hz and the second frequency range may be approximately 1000-8000 Hz.) In some embodiments, the speech boost circuitry 110 may be configured to add different gains in multiple (e.g., more than 2) frequency ranges.

Figure 8:
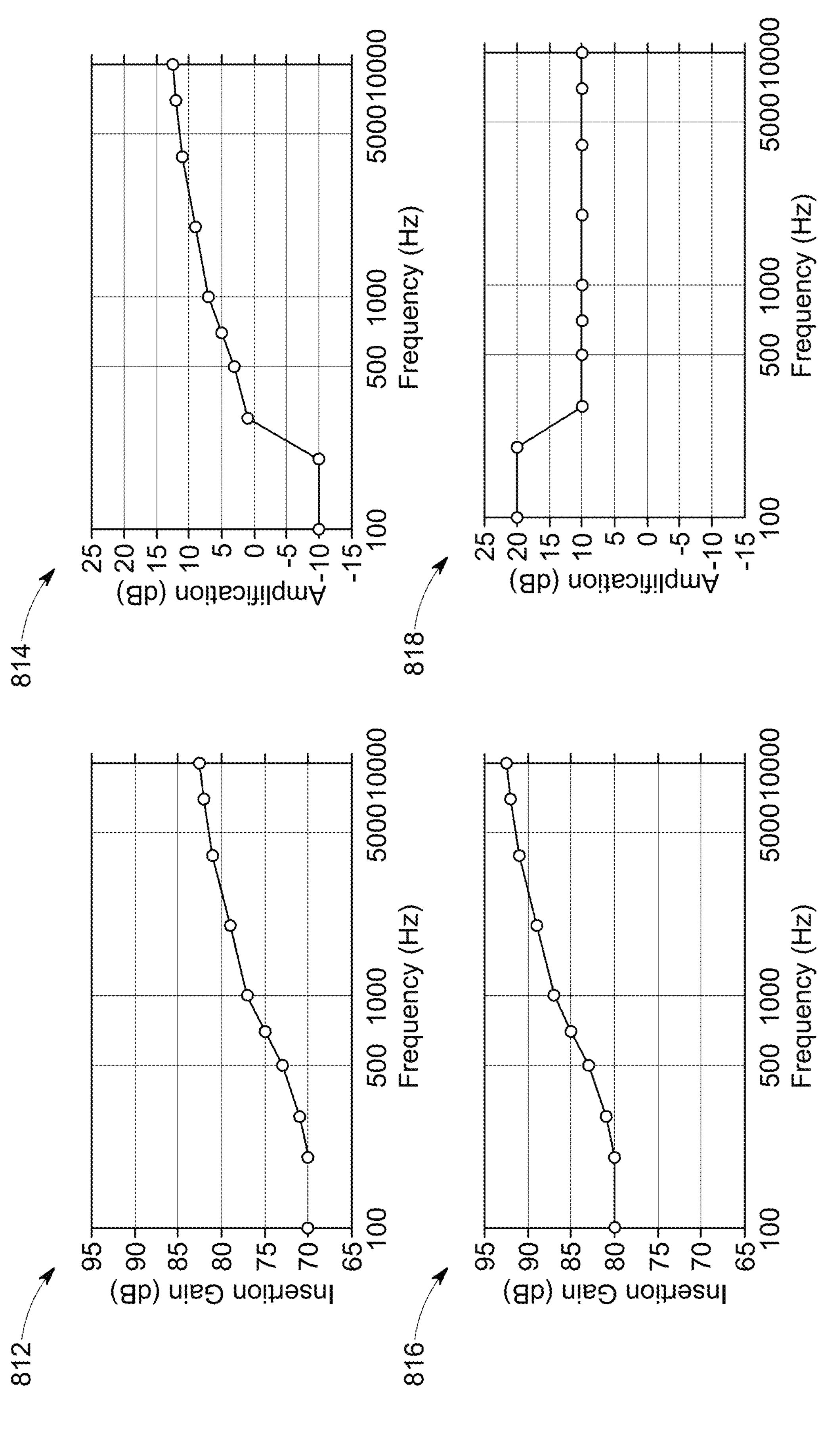
FIG. 8 illustrates an example of wide dynamic range compression (WDRC) and speech boost, in accordance with certain embodiments described herein.

FIG. 8 illustrates an example of WDRC and speech boost, in accordance with certain embodiments described herein. The curve 812 illustrates an example desired post-WDRC insertion gain vs. frequency curve. The curve 814 illustrates an example prescribed WDRC amplification vs. frequency curve for a given input level of 70 dB in order to realize the curve 812. It should be appreciated that low-frequency sounds are attenuated to prevent a comb filter. Thus, for low frequencies, insertion gain may be dominated by the direct path, while for high frequencies, insertion gain may be dominated by the amplified path. The curve 816 illustrates an example post-WDRC and post-speech boost insertion gain vs. frequency curve, which is the curve in the graph 812 raised by 10 dB. In other words, the speech boost amount is a constant 10 dB across all frequencies. The curve 818 illustrates example gains to be implemented by speech boost above the gains implemented by WDRC (e.g., the gains in the graph 814) to realize the insertion gains in the curve 816. It should be appreciated that due at least to the attenuation at low frequencies in the curve 814, the gains in the curve 818 are not constant across frequency, even though the desired speech boost is constant across frequency. Thus, the speech boost circuitry 110 may be configured to implement such non-constant gains across frequencies.

Figure 9:
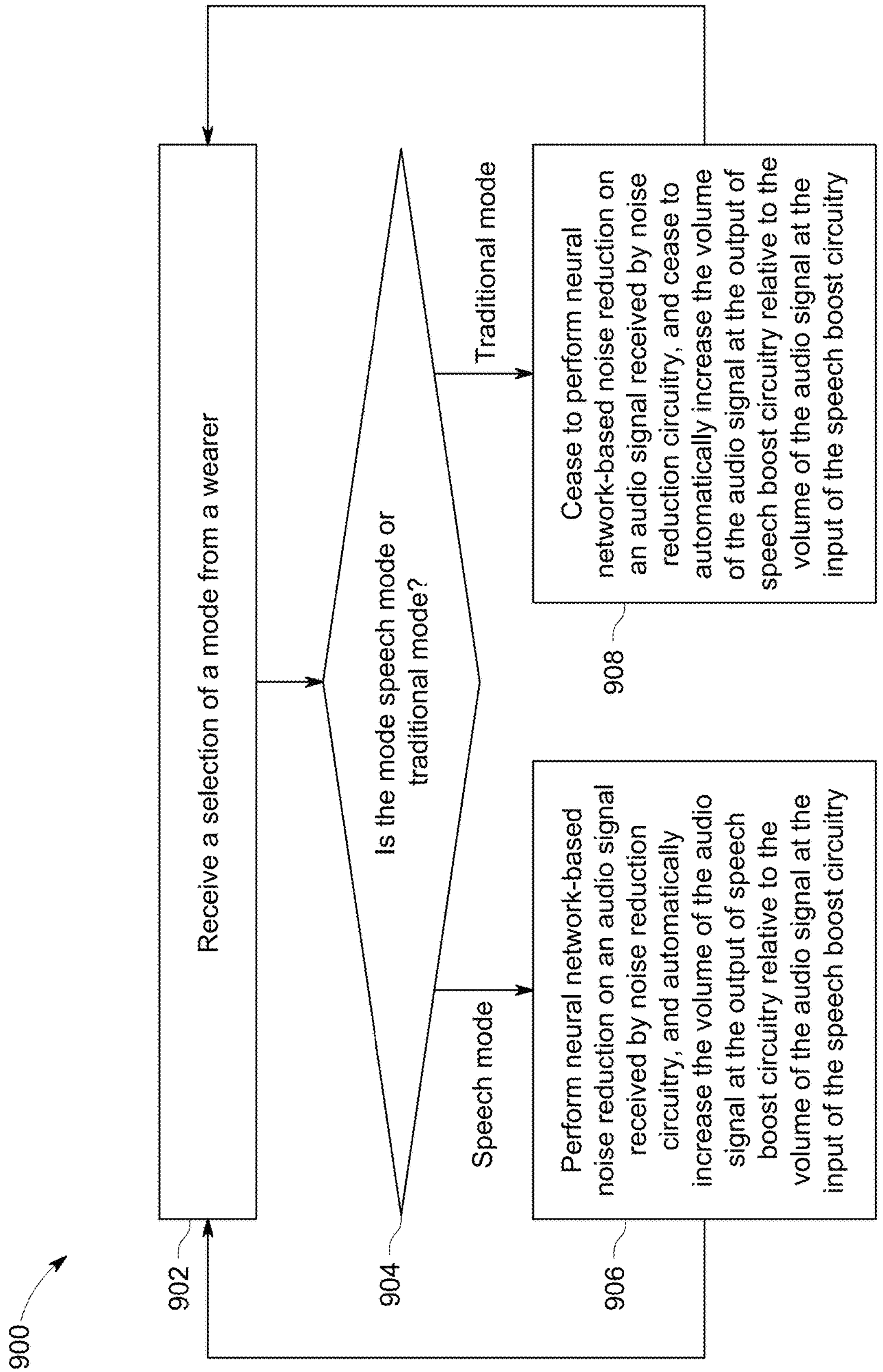
FIG. 9 illustrates a process for operating an ear-worn device, in accordance with certain embodiments described herein.

FIG. 9 illustrates a process 900 for operating the ear-worn device 100 or 200, in accordance with certain embodiments described herein. At step 902, the ear-worn device 100 or 200 receives a selection of a mode from the wearer of the ear-worn device. In some embodiments, the mode options may include a speech mode and a traditional mode. Speech mode may include neural network-based noise reduction (or, equivalently, speech enhancement), while traditional mode might not include network-based noise reduction. In some embodiments the ear-worn device 100 or 200 may receive the selection based on the wearer pressing a button on the ear-worn device 100 or 200, which may toggle between the two modes. In some embodiments, the ear-worn device 100 or 200 may receive the selection based on the wearer selecting an option from a processing device (e.g., a smartphone or a tablet) in operative communication with the ear-worn device. In some embodiments, the control circuitry 112 may receive the selection of the mode at step 902. The process 900 proceeds from step 902 to step 904.

At step 904, the ear-worn device 100 or 200 determines whether the selected mode was speech mode or traditional mode. If the selected mode was speech mode, the process 900 may proceed to step 906. If the selected mode was traditional mode, the process 900 may proceed to step 908. In some embodiments, the control circuitry 112 may perform the determination at step 904.

At step 906, the ear-worn device 100 or 200 performs neural network-based noise reduction on the audio signal received by the noise reduction circuitry 102, such that the audio signal at the output 122 of the noise reduction circuitry 102 is a noise-reduced version of the audio signal at the input 120 of the noise reduction circuitry 102, and automatically increases the volume of the audio signal at the output of speech boost circuitry 110 relative to the volume of the audio signal at the input of the speech boost circuitry 110. In some embodiments, the control circuitry 112 may control the noise reduction circuitry 102 to use the neural network circuitry 104 to perform the neural network-based noise reduction, and control the speech boost circuitry 110 to perform the volume increase. The increase in volume applied by the speech boost circuitry 110 may be in addition to any amplification provided by the WDRC circuitry 108. Further description of various methods by which the speech boost circuitry 110 may increase volume may be found above. The process 900 proceeds from step 906 back to step 902 to await a selection of a new mode.

At step 908, the ear-worn device 100 or 200 ceases to perform the neural network-based noise reduction on the audio signal received by the noise reduction circuitry 102, and ceases to automatically increase the volume of the audio signal at the output 130 of speech boost circuitry 110 relative to the volume of the audio signal at the input 128 of the speech boost circuitry 110. In some embodiments, the control circuitry 112 may control the noise reduction circuitry 102 to cease using the neural network circuitry 104 to perform the neural network-based noise reduction, and control the speech boost circuitry 110 to cease to perform the volume increase. The process 900 proceeds from step 908 back to step 902 to await a selection of a new mode.

It should be appreciated that the volume increase at step 906 is automatic, and is not controlled by any dedicated manual volume control on the ear-worn device 100 or 200 nor by any dedicated manual volume control on a processing device (e.g., a smartphone or tablet) in operative communication with the ear-worn device 100 or 200. Rather, the ear-worn device 100 or 200 applies the volume increase automatically based on receiving a selection of speech mode. If the wearer selects speech mode at step 902, and the ear-worn device 100 or 200 automatically increases the volume by the speech boost amount at step 906, if on a subsequent iteration through the process 900 the wearer then selects traditional mode at step 902, the ear-worn device 100 or 200 automatically ceases to increase the volume by the speech boost amount. Thus, the volume may increase or decrease during the process 900 without the wearer manipulating any dedicated manual volume controls.

In some embodiments, the control circuitry 112 may be configured to control the speech boost circuitry 110 to automatically increase the volume of the audio signal at its output 130 relative to the volume of the audio signal at its input 128 by a first speech boost amount at a first time and then by a second speech boost amount (different from the first speech boost amount) at a second time, but the difference between (1) the gain of the speech component of the audio signal from the input 120 of the noise reduction circuitry 102 to the output 130 of the speech boost circuitry 110, and (2) the gain of the noise component of the audio signal from the input 120 of the noise reduction circuitry 102 to the output 130 of the speech boost circuitry 110, may be the same at the first and second times. As an example, consider that at a first time, the speech and noise components of the audio signal at the input 120 of the noise reduction circuitry 102 is 65 dB. Assume that the noise reduction circuitry 102 reduces the noise component of the audio signal by 15 dB, the WDRC circuitry increases both the speech and noise components of the audio signal by 8 dB, and the speech boost circuitry increases both the speech and noise components of the audio signal by an additional 10 dB. The speech component of the audio signal at the output 130 of the speech boost circuitry 110 is 83 dB, and the noise component of the audio signal at the output 130 of the speech boost circuitry 110 is 68 dB. The gain of the speech component from the input 120 of the noise reduction circuitry 102 to the output 130 of the speech boost circuitry 110 is 18 dB, and the gain of the noise component from the input 120 of the noise reduction circuitry 102 to the output 130 of the speech boost circuitry 110 is 3 dB. Thus, the difference between the gains is 15 dB. Consider that at a second time, the speech boost amount is changed from 10 dB to 8 dB. Then the speech component of the audio signal at the output

130 of the speech boost circuitry 110 is 81 dB, and the noise component of the audio signal at the output 130 of the speech boost circuitry 110 is 66 dB. The gain of the speech component from the input 120 of the noise reduction circuitry 102 to the output 130 of the speech boost circuitry 110 is 16 dB, and the gain of the noise component from the input 120 of the noise reduction circuitry 102 to the output 130 of the speech boost circuitry 110 is 1 dB. Thus, the difference between the gains is 15 dB, same as at the first time.

As one example of different speech boost amounts at different times, as described above, in some embodiments, the control circuitry 112 may be configured to control the speech boost circuitry 110 to implement a larger speech boost amount in a louder environment and a smaller speech boost amount in a quieter environment. Thus, if the environment changes from loud at one time to quiet at another time, the control circuitry 112 may control the speech boost circuitry 110 to change from implementing a larger speech boost amount to a smaller speech boost amount. The difference between (1) the gain of the speech component of the audio signal from the input 120 of the noise reduction circuitry 102 to the output 130 of the speech boost circuitry 110, and (2) the gain of the noise component of the audio signal from the input 120 of the noise reduction circuitry 102 to the output 130 of the speech boost circuitry 110, may be the same at the first and second times.

In some embodiments, the control circuitry 112 may be configured to receive a selection of the speech boost amount, e.g., from an audiologist or other licensed professional during a fitting. For example, the audiologist or other licensed professional's processing device (e.g., a smartphone, tablet, or computer) in operative communication with an ear-worn device may be configured to receive a selection from the audiologist or other licensed professional of a speech boost amount, and the processing device may be configured to transmit an indication of the selected speech boost amount to the ear-worn device, and the control circuitry 112 may receive the indication. Thus, as another example of different speech boost amounts at different times, the audiologist or other licensed professional may select one speech boost amount at one time and another speech boost amount at another time (for example, if the wearer's hearing loss changes). The difference between (1) the gain of the speech component of the audio signal from the input 120 of the noise reduction circuitry 102 to the output 130 of the speech boost circuitry 110, and (2) the gain of the noise component of the audio signal from the input 120 of the noise reduction circuitry 102 to the output 130 of the speech boost circuitry 110, may be the same at the first and second times.

The audiologist or other licensed professional may also select one speech boost amount for one wearer's ear-worn device and select another speech boost amount for another wearer's ear-worn device. For both wearers, the difference in gain between the speech and the noise may be the same.

In some embodiments, the amount of speech boost may be configured in a self-fitting process, or in settings in an app on a processing device in operative communication with the ear-worn device.

Figure 10:
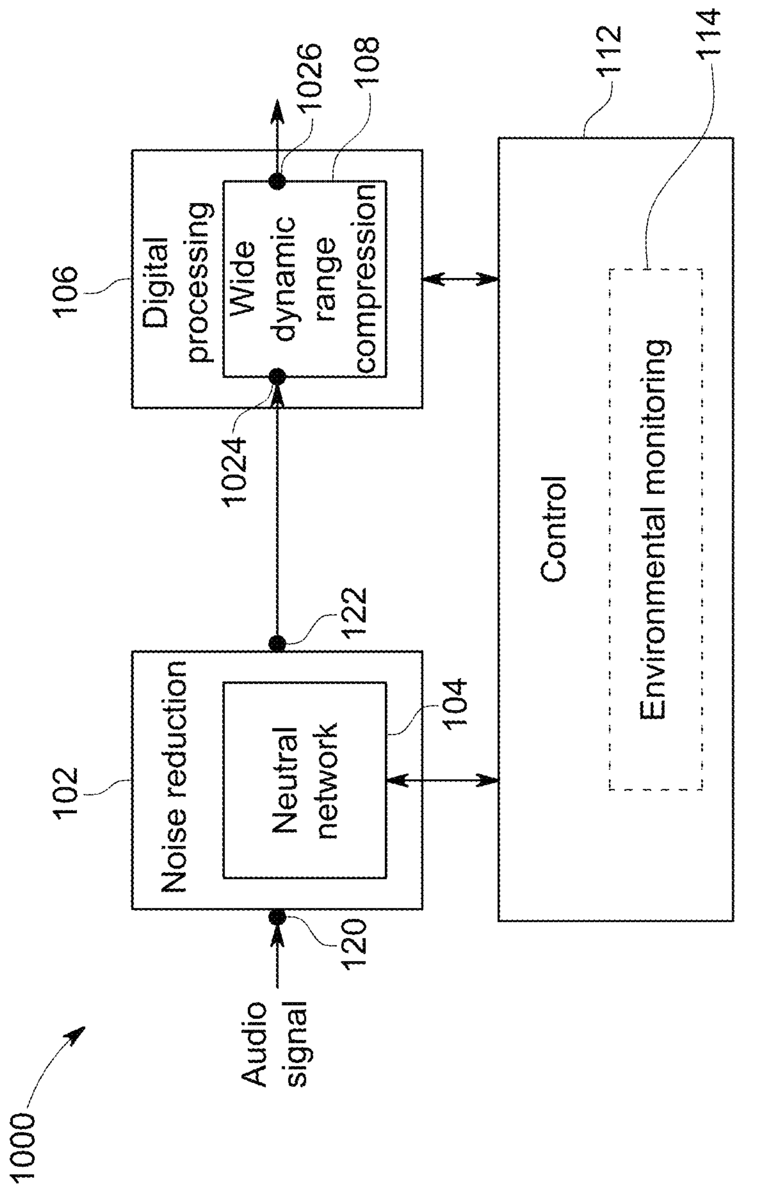
FIG. 10 illustrates circuitry in an ear-worn device, in accordance with certain embodiments described herein.

FIG. 10 illustrates circuitry in an ear-worn device 1000 (e.g., a hearing aid, cochlear implant, earphone, etc.), in accordance with certain embodiments described herein. The circuitry in FIG. 10 is the same as the circuitry in FIGS. 1 and 2, except that dedicated speech boost circuitry is absent. Instead, the WDRC circuitry 108 may be configured to implement speech boost. In particular, the gains applied by the WDRC circuitry 108 may be modified to incorporate both the gains dictated by the fitting formula, and the gain for the volume increase in speech mode (that is implemented by the speech boost circuitry 110 in other embodiments). All the description above may apply to the embodiment of FIG. 10, except that functionality described as being performed by speech boost circuitry may be performed by the WDRC circuitry 108. Thus, based on the control circuitry 112 receiving a selection of speech mode from the wearer of the ear-worn device, the control circuitry 112 may be configured both (1) to control the noise reduction circuitry 102 to perform neural network-based noise reduction on the audio signal received by the noise reduction circuitry 102 using the neural network circuitry 104, and (2) to control the WDRC circuitry 108 to automatically increase the volume of the audio signal at its output 1026 relative to its input 1024 by an extra amount above the amplification provided by the WDRC circuitry 108 in traditional mode. This extra amount may be referred to as the speech boost amount, and is described in more detail above. Based on the control circuitry 112 receiving a selection of traditional mode from the wearer of the ear-worn device, the control circuitry 112 may be configured both (1) to control the noise reduction circuitry 102 to cease to perform neural network-based noise reduction on the audio signal received by the noise reduction circuitry 102 using the neural network circuitry 104, and (2) to control the WDRC circuitry 108 to cease to automatically increase the volume of the audio signal by the extra amount (i.e., the speech boost amount).

In some embodiments, the ear-worn device 1000 may be operated according to the example method shown in FIG. 9 and discussed above in relation to ear-worn devices 100 and 200.

Figure 11:
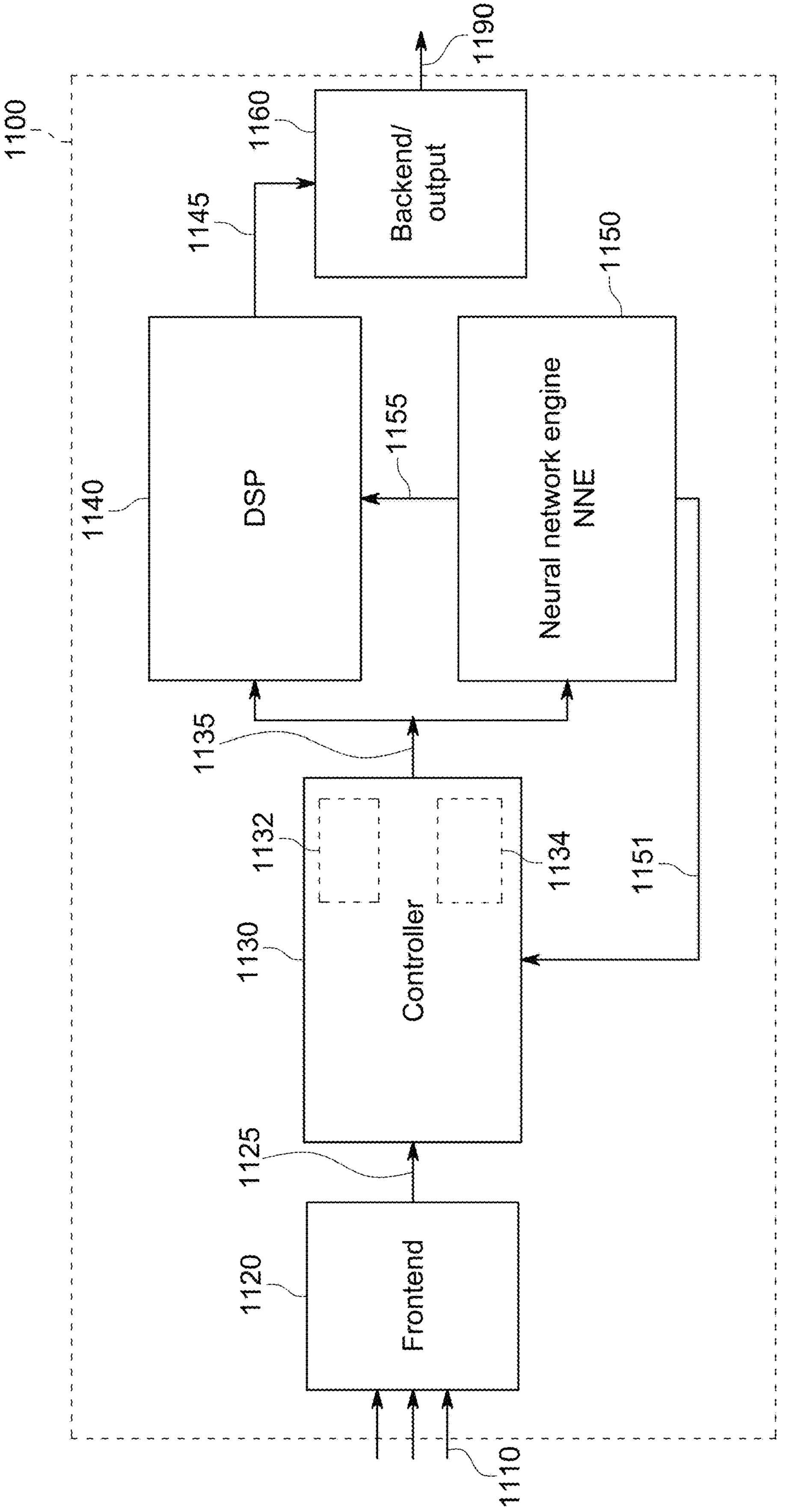
FIG. 11 is a system diagram, in accordance with certain embodiments described herein.

As described above, further description of neural networks may be found in U.S. Pat. No. 11,812,225, titled "Method, apparatus and system for neural network hearing aid," and issued on Nov. 7, 2023, the content of which is incorporated by reference herein in its entirety. For example, FIG. 11 is a system diagram, in accordance with certain embodiments described herein. System 1100 may be implemented in a hearing aid. In an exemplary embodiment, system 1100 is implemented in one or both earpieces of a hearing device. System 1100 may be implemented as an integrated circuit. System 1100 may be implemented as an IC or an SoC. The system 1100 may encompass some or all of the circuitry illustrated in the figures described above. For example, controller 130 may correspond to the control circuitry 112. The neural network engine circuitry 1150 and the DSP 1140 may each encompass some or all of the noise reduction circuitry 102, the digital processing circuitry, and/or the speech boost circuitry 110. The backend/output processor 1160 may correspond to the receivers 324*a* and 324*b*.

System 1100 receives input signals 1110 and provides output signals 1190. Input signals 1110 may comprise acoustic signals emanating from a plurality of sources. The acoustic sources emanating acoustic signals 1110 may include ambient noises, human voice(s), alarm sounds, etc. Each acoustic source may emanate sound at a different volume relative to the other sources. Thus, input signal 1110 may be an amalgamation of different sounds reaching system 1100 at different volumes. Front end receiver 1120 may comprise one or more modules configured to convert incoming acoustic signals 1110 into a digital signal using an analog to digital converter (ADC). The frontend receiver 1120 may also receive signals from one or more microphones at one or more earpieces. In certain embodiments, signals received at one earpiece are transmitted using a low-latency protocol such as near field magnetic induction to the other earpiece for use in signal processing. The output of frontend receiver 1120 is a digital signal 1125 representing one or more received audio streams. It should be noted that while FIG. 11 shows an exemplary embodiment in which frontend 1120 and controller 1130 are separate components, in certain other embodiments, one or more functions of frontend 1120 may be performed at controller 1130 to obviate frontend 1120.

In the embodiment of FIG. 11, NNE circuitry 1150 is interposed between controller 1130 and DSP 1140. Thus, NNE circuitry 1150 is in the direct signal processing path. This means that when said signal path is employed, audio is processed through the neural network and enhanced before that same audio is played out. This is in contrast to methods where neural networks are employed outside the direct signal chain to tune the parameters of the direct signal chain. These methods use the neural network output to enhance subsequently received audio, not the same audio processed through the neural network. In certain embodiments, the NNE circuitry is configured to selectively apply a complex ratio mask to the incoming signal of the frontend receiver to obtain a plurality of components wherein each of the plurality of components corresponds to a class of sounds or an individual speaker, the NNE circuitry is further configured to combine these components into a output signal wherein the volumes of the components are set to obtain a user-controlled signal to noise ratio.

Controller 1130 receives digital signal 1125 from frontend receiver 1120. Controller 1130 may comprise one or more processor circuitries (herein, processors), memory circuitries and other electronic and software components configured to, among others, (a) perform digital signal processing manipulations necessary to prepare the signal for processing by the neural network engine 1150 or the DSP engine 1140, and (b) to determine the next step in the processing chain from among several options. In one embodiment of the disclosure, controller 1130 executes a decision logic to determine whether to advance signal processing through one or both of DSP unit 1140 and neural network engine (NNE) circuitry 1150. It should be noted that frontend 1120 may comprise one or more processors to convert the incoming signal while controller 1130 may comprise one or more processors to execute the exemplary tasks disclosed herein; these functions may be combined and implemented at controller 1130.

DSP 1140 may be configured to apply a set of filters to the incoming audio components. Each filter may isolate incoming signals in a desired frequency range and apply a non-linear, time-varying gain to each filtered signal. The gain value may be set to achieve dynamic range compression or may identify stationary background noise. DSP 1140 may then recombine the filtered and gained signals to provide an output signal.

As stated, in one embodiment, the controller 1130 performs digital signal processing manipulations to prepare the signal for processing by DSP 1140 or, alternatively, by both DSP 1140 and NNE 1150. NNE 1150 and DSP 1140 may accept as input the signal in the time-frequency domain (e.g., signal 1110), so that controller 1130 may take a Short-Time Fourier Transform (STFT) of the incoming signal before passing it onto the controller. In another example, controller 1130 may perform beamforming of signals received at different microphones to enhance the audio coming from a certain direction.

In certain embodiments, controller 1130 continually determines the next step in the signal chain for processing the received audio data. For example, controller 1130 activates NNE 1150 based on one or more of user-controlled criteria, user-agnostic criteria, user clinical criteria, accelerometer data, location information, stored data and the computed metrics characterizing the acoustic environment, such as signal-to-noise ratio (SNR). If NNE 1150 is not activated, controller 1130 instead passes signal 1135 directly to DSP 1140. In some embodiments, controller 1130 may pass data to both NNE 1150 and DSP 1140 simultaneously as indicated in FIG. 11.

User-controlled criteria (interchangeably, logic or user-defined) may comprise user inputs including the selection of an operating mode through an application on a user's smartphone or input on the device (for example by tapping the device). For example, when a user is at a restaurant, she may change the operating mode to noise cancellation/speech isolation by making an appropriate selection on her smartphone. User-controlled criteria may also comprise a set of user-defined settings and preferences which may be either input by the user through an application (app) or learned by the device over time. For example, user-controlled logic may comprise a user's preferences around what sounds the user hears (e.g., new parents may want to always amplify a baby's cry, or a dog owner may want to always amplify barking) or the user's general tolerance for background noise. User clinical criteria may comprise a clinically relevant hearing profile, including, for example, the user's general degree of hearing loss and the user's ability to comprehend speech in the presence of noise.

User-controlled logic may also be used in connection with or aside from user-agnostic criteria (or logic). User-agnostic logic may consider variables that are independent of the user. For example, the user-agnostic logic may consider the hearing aid's available power level, the time of day or the expected duration of NNE operation (as a function of the anticipated NNE execution demands).

In some embodiments, acceleration data as captured on sensors (not shown) in the device 1100 may aid controller 1130 in determining whether to direct signal controller output signal 1135 to one or both of DSP 1140 and NNE 1150. Movement or acceleration information may guide controller 1130 to determine whether the user is in motion or sedentary. Acceleration data may be used in conjunction with other information or may be overwritten by other data. Similarly, data from sensors capturing acceleration may be provided to the neural network as information for inference.

In other embodiments, the user's location may be used by controller 1130 to determine whether to engage one or both of DSP 1140 and NNE circuitry 1150. Certain locations may require activation of NNE circuitry 1150. For example, if the user's location indicates high ambient noise (e.g., the user is strolling through a park or is attending a concert) and no direct conversation, controller 1130 may activate DSP 1140 only. On the other hand, if the user's location suggests that the user is traveling (e.g., via car or train) and other indicators suggest human communication, then NNE circuitry 1150 may be activated to amplify human voices over the surrounding noise.

Stored data may also be a factor in controller 1130 determination of the processing path. Stored data may include important characteristics of user-specific sounds, voices, preferences or commands. System 1100 may optionally comprise storage circuitry 1132 to store data representing voices that, when detected, may serve as an input to the controller's logic. Storage circuitry 1132 may be local as illustrated or may be remote from the hearing device. The stored data may include a so-called voice registry of known conversation partners. The voice registry may provide the information necessary for the neural network to detect and isolate specific voices from background noise. The voice registry may contain discriminative embeddings for each registered voice computed by a neural network not on the device (i.e., the large NNE), described herein as a voice signature, and the neural network on the device (i.e., local NNE) may be configured to accept the voice signatures as an input to isolate speech that matches the signature.

In addition to the voice signatures, system 1100 may store different preferences for each voice in the storage circuitry (registry) 1132 such that different speakers elicit different behavior from the device. NNE 1150 may subsequently implement various algorithms to determine which voices to amplify relative to other sounds.

Controller 1130 may execute algorithmic logic to select a processing path. Controller 1130 may consider the detected SNR and determine whether DSP 1140 only or or both DSP 1140 and NNE 1150 should be engaged. In one implementation, controller 1130 compares the detected SNR value with a threshold value and determines which processing path to initiate. The threshold value may be one or more of empirically determined, user-agnostic or user-controlled. Controller 1130 may also consider other user preferences and parameters in determining the threshold value as discussed above.

In another embodiment, Controller 1130 may compute certain metrics to characterize the incoming audio as input for determining a subsequent processing path. These metrics may be computed based on the received audio signal. For example, controller 1130 may detect periods of silence, knowing that silence does not require neural network enhancement and it should therefore engage DSP 1140 only. In a more complex example, controller 1130 may include a Voice Activity Detector (VAD) 1134 to determine the processing path in a speech-isolation mode. In some embodiments, the VAD might be a much smaller (i.e., much less computationally intensive) neural network in the controller.

In an exemplary embodiment, Controller 1130 may receive output 1151 of NNE 1150 for recently processed audio as input to its calculations. NNE 1150, which may be configured to isolate target audio in the presence of background noise, provides the inputs necessary to robustly estimate the SNR. Controller 1130 may in turn leverage this capability to detect when the SNR of the incoming signal is high enough or low enough to influence the processing path. In still another example, the output of NNE 1150 may be used as the foundation of a more robust VAD 1134. Voice detection in the presence of noise is computationally intensive. By leveraging the output of NNE 1150, system 1100 can implement this task with minimal computation overhead.

When Controller 1130 utilizes NNE output 1151, it can only utilize output 1151 to influence the signal path for subsequently received audio. When a given sample of audio is received at the controller, the output of NNE 1150 for that sample is not yet computed and so it cannot be used to influence the controller decision for that sample. But because the acoustic environment from less than a second ago is predictive of the current environment, the NNE output for audio received previously can be used.

When NNE 1150 is activated, using NNE output 1151 in the controller does not incur any additional computational cost. In certain embodiments, Controller 1130 may engage NNE 1150 for supportive computation even in a mode when NNE 1150 is not the selected signal path. In such a mode, incoming audio signal is passed directly from controller 1130 to DSP 1140 but data (i.e., audio clips) is additionally passed at less frequent intervals to NNE 1150 for computation. This computation may provide an estimate of the SNR of the surrounding environment or detect speech in the presence of noise in substantially real time. In an exemplary implementation, controller 1130 may send a 16 ms window of data once every second for VAD 1134 detection at NNE 1150. In some embodiments, NNE 1150 may be used for VAD instead of controller 1130. In another implementation, controller 1130 may dynamically adjust the duration of the audio clip or the frequency of communicating the audio clip as a function of the estimated probability of useful computation. For example, if recent requests have shown a highly variable SNR, Controller 1130 may request additional NNE computation at more frequent intervals.

NNE 1150 may comprise one or more actual and virtual circuitries to receive controller output signal 1135 and provide enhanced digital signal 1155. In an exemplary embodiment, NNE 1150 enhances the signal by using a neural network algorithm (NN model) to generate a set of intermediate signals. Each intermediate signal is a representative of one or more of the original sound sources that constitute the original signal. For example, incoming signal 1110 may comprise two speakers, an alarm and other background noise. In some embodiments, the NN model executed on NNE 1150 may generate a first intermediate signal representing the speech and a second first intermediate signal representing the background noise. NNE 1150 may also isolate one of the speakers from the other speaker. NNE 1150 may isolate the alarm from the remaining background noise to ensure that the user hears the alarm even when the noise-canceling mode is activated. Different situations may require different intermediate signals and different embodiments of this invention may contain different neural networks with different capabilities best suited to the wearer's needs. In certain embodiments, a remote (off-chip) NNE may augment the capability of the local (on-chip) NNE.

Output 1145 of DSP 1140 may be directed to backend/output processor 1160. Backend processing circuitry 1160 may comprise one or more circuitries to convert the processed signal bands 1145 to audible signals in the time domain. By way of example, backend processor 1160 may comprise a digital-to-analog (DAC) converter (not shown) to convert amplified digital signals to analog signals. The DAC may then deliver the analog signals to a driver and to one or more diaphragm-type speakers (not shown) to display the processed and amplified sound to the user.

Example A1 is directed to an ear-worn device, comprising: control circuitry configured to activate a speech mode of the ear-worn device or to activate a traditional mode of the ear-worn device, wherein the speech mode comprises neural network-based noise reduction and the traditional mode does not comprise neural network-based noise reduction; noise reduction circuitry comprising neural network circuitry configured to perform the neural network-based noise reduction; digital processing circuitry comprising wide dynamic range compression (WDRC) circuitry; and speech boost circuitry comprising an input and an output; wherein: based on the control circuitry activating the speech mode, the control circuitry is configured to control: the noise reduction circuitry to perform the neural network-based noise reduction on an audio signal received by the noise reduction circuitry using the neural network circuitry; and the speech boost circuitry to automatically increase a volume of the audio signal at its output relative to the volume of the audio signal at its input, wherein the increase in the volume is in addition to any amplification applied by the WDRC circuitry; and based on the control circuitry activating the traditional mode, the control circuitry is configured to control: the noise reduction circuitry to cease to perform the neural network-based noise reduction on the audio signal received by the noise reduction circuitry; and the speech boost circuitry to cease to automatically increase the volume of the audio signal at its output relative to the volume of the audio signal at its input.

Example A2 is directed to the ear-worn device of example A1, wherein the digital processing circuitry is coupled between the noise reduction circuitry and the speech boost circuitry, or the speech boost circuitry is coupled between the noise reduction circuitry and the digital processing circuitry.

Example A3 is directed to the ear-worn device of example A1 or A2, wherein the increase in volume applied by the speech boost circuitry is independent of a user-controllable dedicated volume input.

Example A4 is directed to the ear-worn device of any of examples A1-A3, wherein the increase in volume applied by the speech boost circuitry is not controlled by any dedicated manual volume control on the ear-worn device nor by any dedicated manual volume control on a processing device in operative communication with the ear-worn device.

Example A5 is directed to the ear-worn device of any of examples A1-A4, wherein the control circuitry is configured to control the speech boost circuitry to automatically increase the volume of the audio signal at its output relative to the volume of the audio signal at its input by a speech boost amount, wherein the speech boost amount is an amount of the neural network-based noise reduction multiplied by a constant.

Example A6 is directed to the ear-worn device of any of examples A1-A4, wherein the control circuitry is configured to control the speech boost circuitry to automatically increase the volume of the audio signal at its output relative to the volume of the audio signal at its input by a speech boost amount, wherein the speech boost amount is an amount of the neural network-based noise reduction multiplied by a constant, minus an estimate of tip attenuation.

Example A7 is directed to the ear-worn device of any of examples A1-A4, wherein the control circuitry is configured to control the speech boost circuitry to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater.

Example A8 is directed to the ear-worn device of any of examples A1-A4, wherein the control circuitry is configured to control the speech boost circuitry to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater, minus an estimate of tip attenuation.

Example A9 is directed to the ear-worn device of any of examples A1-A4, wherein: the control circuitry further comprises environmental monitoring circuitry; the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount, wherein the speech boost amount is larger in a louder environment and smaller in a quieter environment.

Example A10 is directed to the ear-worn device of any of examples A1-A4, wherein: the control circuitry further comprises environmental monitoring circuitry; the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount, wherein the speech boost amount is smaller in a louder environment and larger in a quieter environment.

Example A11 is directed to the ear-worn device of any of examples A1-A4, wherein: the control circuitry further comprises environmental monitoring circuitry; the control circuitry is further configured to use the environmental monitoring circuitry to estimate a direct path noise level and a direct path speech level; and the control circuitry is configured to control, based on the estimated direct path noise level and the estimated direct path speech level, the speech boost circuitry to automatically increase the volume of the audio signal at its output relative to the volume of the audio signal at its input by a speech boost amount, wherein the speech boost amount is larger in a lower SNR environment and smaller in a higher SNR environment.

Example A12 is directed to the ear-worn device of any of examples A1-A4, wherein: the control circuitry further comprises environmental monitoring circuitry; the control circuitry is further configured to use the environmental monitoring circuitry to estimate a direct path noise level and a direct path speech level; and the control circuitry is configured to control, based on the estimated direct path noise level and the estimated direct path speech level, the speech boost circuitry to automatically increase the volume of the audio signal at its output relative to the volume of the audio signal at its input by a speech boost amount, wherein the speech boost amount is smaller in a lower SNR environment and larger in a higher SNR environment.

Example A13 is directed to the ear-worn device of any of examples A1-A4, wherein: the control circuitry further comprises environmental monitoring circuitry; the control circuitry is further configured to use the environmental monitoring circuitry to estimate an environmental SNR; and the control circuitry is configured to control, based on the estimated SNR, the speech boost circuitry to automatically increase the volume of the audio signal at its output relative to the volume of the audio signal at its input by a speech boost amount, wherein the speech boost amount is larger in a lower SNR environment and smaller in a higher SNR environment.

Example A14 is directed to the ear-worn device of any of examples A1-A4, wherein: the control circuitry further comprises environmental monitoring circuitry; the control circuitry is further configured to use the environmental monitoring circuitry to estimate an environmental SNR; and the control circuitry is configured to control, based on the estimated SNR, the speech boost circuitry to automatically increase the volume of the audio signal at its output relative to the volume of the audio signal at its input by a speech boost amount, wherein the speech boost amount is smaller in a lower SNR environment and larger in a higher SNR environment.

Example A15 is directed to the ear-worn device of any of examples A1-A4, wherein: the control circuitry further comprises environmental monitoring circuitry; the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount such that a speech component of the audio signal at its output is at least a certain amount louder than the estimated direct path noise level.

Example A16 is directed to the ear-worn device of any of examples A1-A15, wherein the control circuitry is configured to control the speech boost circuitry to amplify volume equally across all frequencies within an operating range of the device.

Example A17 is directed to the ear-worn device of any of examples A1-A15, wherein the control circuitry is configured to control the speech boost circuitry to implement a constant increase in insertion gain across all frequencies within an operating range of the device.

Example A18 is directed to the ear-worn device of example A17, wherein the control circuitry is configured to control the speech boost circuitry to add more gain in low frequencies than at high frequencies.

Example A19 is directed to the ear-worn device of example A17, wherein the control circuitry is configured to control the speech boost circuitry to add a first gain in a first frequency range and a second gain in a second frequency range, wherein the first gain is higher than the second gain and the first frequency range is at lower frequencies than the second frequency range.

Example A20 is directed to the ear-worn device of any of examples A1-A19, wherein: the control circuitry is configured to control the speech boost circuitry to automatically increase the volume of the audio signal at its output relative to the volume of the audio signal at its input by a first speech boost amount at a first time; the control circuitry is configured to control the speech boost circuitry to automatically increase the volume of the audio signal at its output relative to the volume of the audio signal at its input by a second speech boost amount at a second time; and a difference between (1) a gain of a speech component of the audio signal from an input of the noise reduction circuitry to the output of the speech boost circuitry, and (2) a gain of a noise component of the audio signal from the input of the noise reduction circuitry to the output of the speech boost circuitry, is the same at the first and second times.

Example A21 is directed to the ear-worn device of any of examples A1-A4 and A16-A20, wherein the control circuitry is configured: to receive input indicating a selected speech boost amount; to control the speech boost circuitry to automatically increase the volume of the audio signal at its output relative to the volume of the audio signal at its input by the selected speech boost amount.

Example A22 is directed to the ear-worn device of any of examples A1-A21, wherein the control circuitry is configured to activate the speech mode or to activate the traditional mode based on receiving input indicating a selection of the speech mode or the traditional mode.

Example A23 is directed to the ear-worn device of example A22, wherein the control circuitry is configured to receive the input based on a wearer pressing a button on the ear-worn device.

Example A24 is directed to the ear-worn device of any of examples A22-A23, wherein the ear-worn device is part of a system that comprises a physical, manual volume control that is different from the button.

Example A25 is directed to the ear-worn device of example A22, wherein the control circuitry is configured to receive the input based on selection of an option displayed on a processing device in operative communication with the ear-worn device.

Example A26 is directed to the ear-worn device of example A25, wherein the processing device further displays a manual volume control that is different from the option.

Example A27 is directed to the ear-worn device of any of examples A1-A26, wherein the control circuitry is configured to activate the speech mode or to activate the traditional mode based on computed metrics characterizing an acoustic environment.

Example A28 is directed to the ear-worn device of example A27, wherein the computed metrics characterizing the acoustic environment comprise signal-to-noise ratio (SNR).

Example B1 is directed to an ear-worn device, comprising: control circuitry configured to receive a selection of a speech mode of the ear-worn device or a selection of a traditional mode of the ear-worn device, wherein the speech mode comprises neural network-based noise reduction and the traditional mode does not comprise neural network-based noise reduction; noise reduction circuitry comprising neural network circuitry; digital processing circuitry comprising wide dynamic range compression (WDRC) circuitry; and speech boost circuitry comprising an input and an output; wherein: based on the control circuitry receiving the selection of the speech mode, the control circuitry is configured to control: the noise reduction circuitry to perform the neural network-based noise reduction on an audio signal received by the noise reduction circuitry using the neural network circuitry; and the speech boost circuitry to automatically increase a volume of the audio signal at its output relative to the volume of the audio signal at its input, wherein the increase in the volume is in addition to any amplification applied by the WDRC circuitry; and based on the control circuitry receiving the selection of the traditional mode, the control circuitry is configured to control: the noise reduction circuitry to cease to perform the neural network-based noise reduction on the audio signal received by the noise reduction circuitry; and the speech boost circuitry to cease to automatically increase the volume of the audio signal at its output relative to the volume of the audio signal at its input.

Example B2 is directed to the ear-worn device of example B1, wherein the digital processing circuitry is coupled between the noise reduction circuitry and the speech boost circuitry, or the speech boost circuitry is coupled between the noise reduction circuitry and the digital processing circuitry.

Example B3 is directed to the ear-worn device of example B1 or B2, wherein the increase in volume applied by the speech boost circuitry is independent of a user-controllable dedicated volume input.

Example B4 is directed to the ear-worn device of any of examples B1-B3, wherein the volume increase applied by the speech boost circuitry is not controlled by any dedicated manual volume control on the ear-worn device nor by any dedicated manual volume control on a processing device in operative communication with the ear-worn device.

Example B5 is directed to the ear-worn device of any of examples B1-B4, wherein the control circuitry is configured to control the speech boost circuitry to automatically increase the volume of the audio signal at its output relative to the volume of the audio signal at its input by a speech boost amount, wherein the speech boost amount is an amount of the neural network-based noise reduction multiplied by a constant.

Example B6 is directed to the ear-worn device of any of examples B1-B4, wherein the control circuitry is configured to control the speech boost circuitry to automatically increase the volume of the audio signal at its output relative to the volume of the audio signal at its input by a speech boost amount, wherein the speech boost amount is an amount of the neural network-based noise reduction multiplied by a constant, minus an estimate of tip attenuation.

Example B7 is directed to the ear-worn device of any of examples B1-B4, wherein the control circuitry is configured to control the speech boost circuitry to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater.

Example B8 is directed to the ear-worn device of any of examples B1-B4, wherein the control circuitry is configured to control the speech boost circuitry to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater, minus an estimate of tip attenuation.

Example B9 is directed to the ear-worn device of any of examples B1-B4, wherein: the control circuitry further comprises environmental monitoring circuitry; the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount, wherein the speech boost amount is larger in a louder environment and smaller in a quieter environment.

Example B10 is directed to the ear-worn device of any of examples B1-B4, wherein: the control circuitry further comprises environmental monitoring circuitry; the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount, wherein the speech boost amount is smaller in a louder environment and larger in a quieter environment.

Example B11 is directed to the ear-worn device of any of examples B1-B4, wherein: the control circuitry further comprises environmental monitoring circuitry; the control circuitry is further configured to use the environmental monitoring circuitry to estimate a direct path noise level and a direct path speech level; and the control circuitry is configured to control, based on the estimated direct path noise level and the estimated direct path speech level, the speech boost circuitry to automatically increase the volume of the audio signal at its output relative to the volume of the audio signal at its input by a speech boost amount, wherein the speech boost amount is larger in a lower SNR environment and smaller in a higher SNR environment.

Example B12 is directed to the ear-worn device of any of examples B1-B4, wherein: the control circuitry further comprises environmental monitoring circuitry; the control circuitry is further configured to use the environmental monitoring circuitry to estimate a direct path noise level and a direct path speech level; and the control circuitry is configured to control, based on the estimated direct path noise level and the estimated direct path speech level, the speech boost circuitry to automatically increase the volume of the audio signal at its output relative to the volume of the audio signal at its input by a speech boost amount, wherein the speech boost amount is smaller in a lower SNR environment and larger in a higher SNR environment.

Example B13 is directed to the ear-worn device of any of examples B1-B4, wherein: the control circuitry further comprises environmental monitoring circuitry; the control circuitry is further configured to use the environmental monitoring circuitry to estimate an environmental SNR; and the control circuitry is configured to control, based on the estimated SNR, the speech boost circuitry to automatically increase the volume of the audio signal at its output relative to the volume of the audio signal at its input by a speech boost amount, wherein the speech boost amount is larger in a lower SNR environment and smaller in a higher SNR environment.

Example B14 is directed to the ear-worn device of any of examples B1-B4, wherein: the control circuitry further comprises environmental monitoring circuitry; the control circuitry is further configured to use the environmental monitoring circuitry to estimate an environmental SNR; and the control circuitry is configured to control, based on the estimated SNR, the speech boost circuitry to automatically increase the volume of the audio signal at its output relative to the volume of the audio signal at its input by a speech boost amount, wherein the speech boost amount is smaller in a lower SNR environment and larger in a higher SNR environment.

Example B15 is directed to the ear-worn device of any of examples B1-B4, wherein: the control circuitry further comprises environmental monitoring circuitry; the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount such that a speech component of the audio signal at its output is at least a certain amount louder than the estimated direct path noise level.

Example B16 is directed to the ear-worn device of any of examples B1-B15, wherein the control circuitry is configured to control the speech boost circuitry to amplify volume equally across all frequencies within an operating range of the device.

Example B17 is directed to the ear-worn device of any of examples B1-B15, wherein the control circuitry is configured to control the speech boost circuitry to implement a constant increase in insertion gain across all frequencies within an operating range of the device.

Example B18 is directed to the ear-worn device of example B17, wherein the control circuitry is configured to control the speech boost circuitry to add more gain in low frequencies than at high frequencies.

Example B19 is directed to the ear-worn device of example B17, wherein the control circuitry is configured to control the speech boost circuitry to add a first gain in a first frequency range and a second gain in a second frequency range, wherein the first gain is higher than the second gain and the first frequency range is at lower frequencies than the second frequency range.

Example B20 is directed to the ear-worn device of any of examples B1-B19, wherein: the control circuitry is configured to control the speech boost circuitry to automatically increase the volume of the audio signal at its output relative to the volume of the audio signal at its input by a first speech boost amount at a first time; the control circuitry is configured to control the speech boost circuitry to automatically increase the volume of the audio signal at its output relative to the volume of the audio signal at its input by a second speech boost amount at a second time; and a difference between (1) a gain of a speech component of the audio signal from an input of the noise reduction circuitry to the output of the speech boost circuitry, and (2) a gain of a noise component of the audio signal from the input of the noise reduction circuitry to the output of the speech boost circuitry, is the same at the first and second times.

Example B21 is directed to thee ear-worn device of any of examples B1-B4 and B16-B20, wherein the control circuitry is configured: to control the speech boost circuitry to automatically increase the volume of the audio signal at its output relative to the volume of the audio signal at its input by a first speech boost amount; and to receive a selection of the speech boost amount.

Example B22 is directed to the ear-worn device of any of examples B1-B21, wherein the control circuitry is configured to receive the selection of the speech mode or the selection of the traditional mode from a wearer of the ear-worn device.

Example B23 is directed to the ear-worn device of example B22, wherein the control circuitry is configured to receive the selection of the speech mode or the selection of the traditional mode from the wearer of the ear-worn device based on the wearer pressing a button on the ear-worn device.

Example B24 is directed to the ear-worn device of any of examples B22-B23, wherein the ear-worn device is part of a system that comprises a physical, manual volume control that is different from the button.

Example B25 is directed to the ear-worn device of example B22, wherein the control circuitry is configured to receive the selection of the speech mode or the selection of the traditional mode from the wearer of the ear-worn device based on the wearer selecting an option displayed on a processing device in operative communication with the ear-worn device.

Example B26 is directed to the ear-worn device of example B25, wherein the processing device further displays a manual volume control that is different from the option.

Example B27 is directed to the ear-worn device of any of examples B1-B26, wherein the control circuitry is configured to receive the selection of the speech mode or the selection of the traditional mode based on computed metrics characterizing an acoustic environment.

Example B28 is directed to the ear-worn device of example B27, wherein the computed metrics characterizing the acoustic environment comprise signal-to-noise ratio (SNR).

Example C1 is directed to an ear-worn device, comprising: noise reduction circuitry comprising neural network circuitry and configured to perform neural network-based noise reduction on an audio signal received by the noise reduction circuitry using the neural network circuitry; digital processing circuitry comprising wide dynamic range compression (WDRC) circuitry; and speech boost circuitry comprising an input and an output; wherein: the speech boost circuitry is configured to automatically increase a volume of the audio signal at its output relative to the volume of the audio signal at its input, wherein the increase in the volume is in addition to any amplification applied by the WDRC circuitry.

Example C2 is directed to the ear-worn device of example C1, wherein the digital processing circuitry is coupled between the noise reduction circuitry and the speech boost circuitry, or the speech boost circuitry is coupled between the noise reduction circuitry and the digital processing circuitry.

Example C3 is directed to the ear-worn device of example C1 or C2, wherein the increase in volume applied by the speech boost circuitry is independent of a user-controllable dedicated volume input.

Example C4 is directed to the ear-worn device of any of examples C1-C3, wherein the volume increase applied by the speech boost circuitry is not controlled by any dedicated manual volume control on the ear-worn device nor by any dedicated manual volume control on a processing device in operative communication with the ear-worn device.

Example C5 is directed to the ear-worn device of any of examples C1-C4, wherein the speech boost circuitry is configured to automatically increase the volume of the audio signal at its output relative to the volume of the audio signal at its input by a speech boost amount, wherein the speech boost amount is an amount of the neural network-based noise reduction multiplied by a constant.

Example C6 is directed to the ear-worn device of any of examples C1-C4, wherein the speech boost circuitry is configured to automatically increase the volume of the audio signal at its output relative to the volume of the audio signal at its input by a speech boost amount, wherein the speech boost amount is an amount of the neural network-based noise reduction multiplied by a constant, minus an estimate of tip attenuation.

Example C7 is directed to the ear-worn device of any of examples C1-C4, wherein the speech boost circuitry is configured to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater.

Example C8 is directed to the ear-worn device of any of examples C1-C4, wherein the speech boost circuitry is configured to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater, minus an estimate of tip attenuation.

Example C9 is directed to the ear-worn device of any of examples C1-C4, wherein: the ear-worn device further comprises environmental monitoring circuitry configured to estimate a direct path noise level; and the speech boost circuitry is configured, based on the estimated direct path noise level, to automatically increase the volume of the audio signal at its output relative to the volume of the audio signal at its input by a speech boost amount, wherein the speech boost amount is larger in a louder environment and smaller in a quieter environment.

Example C10 is directed to the ear-worn device of any of examples C1-C4, wherein: the ear-worn device further comprises environmental monitoring circuitry configured to estimate a direct path noise level; and the speech boost circuitry is configured, based on the estimated direct path noise level, to automatically increase the volume of the audio signal at its output relative to the volume of the audio signal at its input by a speech boost amount, wherein the speech boost amount is smaller in a louder environment and larger in a quieter environment.

Example C11 is directed to the ear-worn device of any of examples C1-C4, wherein: the ear-worn device further comprises environmental monitoring circuitry configured to estimate a direct path noise level and a direct path speech level; and the speech boost circuitry is configured, based on the estimated direct path noise level and the estimated direct path speech level, to automatically increase the volume of the audio signal at its output relative to the volume of the audio signal at its input by a speech boost amount, wherein the speech boost amount is larger in a lower SNR environment and smaller in a higher SNR environment.

Example C12 is directed to the ear-worn device of any of examples C1-C4, wherein: the ear-worn device further comprises environmental monitoring circuitry configured to to estimate a direct path noise level and a direct path speech level; and the speech boost circuitry is configured, based on the estimated direct path noise level and the estimated direct path speech level, to automatically increase the volume of the audio signal at its output relative to the volume of the audio signal at its input by a speech boost amount, wherein the speech boost amount is smaller in a lower SNR environment and larger in a higher SNR environment.

Example C13 is directed to the ear-worn device of any of examples C1-C4, wherein: the ear-worn device further comprises environmental monitoring circuitry configured to estimate an environmental SNR; and the speech boost circuitry is configured to control, based on the estimated SNR, to automatically increase the volume of the audio signal at its output relative to the volume of the audio signal at its input by a speech boost amount, wherein the speech boost amount is larger in a lower SNR environment and smaller in a higher SNR environment.

Example C14 is directed to the ear-worn device of any of examples C1-C4, wherein: the ear-worn device further comprises environmental monitoring circuitry configured to estimate an environmental SNR; and the speech boost circuitry is configured to control, based on the estimated SNR, to automatically increase the volume of the audio signal at its output relative to the volume of the audio signal at its input by a speech boost amount, wherein the speech boost amount is smaller in a lower SNR environment and larger in a higher SNR environment.

Example C15 is directed to the ear-worn device of any of examples C1-C4, wherein: the ear-worn device further comprises environmental monitoring circuitry configured to estimate a direct path noise level; and the speech boost circuitry is configured, based on the estimated direct path noise level, to automatically increase the volume of the audio signal at its output relative to the volume of the audio signal at its input by a speech boost amount such that a speech component of the audio signal at its output is at least a certain amount louder than the estimated direct path noise level.

Example C16 is directed to the ear-worn device of any of examples C1-C15, wherein the speech boost circuitry is configured to amplify volume equally across all frequencies within an operating range of the device.

Example C17 is directed to the ear-worn device of any of examples C1-C15, wherein the speech boost circuitry is configured to implement a constant increase in insertion gain across all frequencies within an operating range of the device.

Example C18 is directed to the ear-worn device of example C17, wherein the speech boost circuitry is configured to add more gain in low frequencies than at high frequencies Example C19 is directed to the ear-worn device of example C17, wherein the control circuitry is configured to control the speech boost circuitry to add a first gain in a first frequency range and a second gain in a second frequency range, wherein the first gain is higher than the second gain and the first frequency range is at lower frequencies than the second frequency range.

Example C20 is directed to the ear-worn device of any of examples C1-C19, wherein: the speech boost circuitry is configured to automatically increase the volume of the audio signal at its output relative to the volume of the audio signal at its input by a first speech boost amount at a first time; the speech boost circuitry is configured to automatically increase the volume of the audio signal at its output relative to the volume of the audio signal at its input by a second speech boost amount at a second time; and a difference between (1) a gain of a speech component of the audio signal from an input of the noise reduction circuitry to the output of the speech boost circuitry, and (2) a gain of a noise component of the audio signal from the input of the noise reduction circuitry to the output of the speech boost circuitry, is the same at the first and second times.

Example C21 is directed to the ear-worn device of any of examples C1-C4 and C16-C20, wherein: the speech boost circuitry is configured to automatically increase the volume of the audio signal at its output relative to the volume of the audio signal at its input by a first speech boost amount; and the ear-worn device is configured to receive a selection of the speech boost amount.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified.

The terms “approximately” and “about” may be used to mean within ±20% of a target value in some embodiments, within ±10% of a target value in some embodiments, within ±5% of a target value in some embodiments, and yet within ±2% of a target value in some embodiments. The terms “approximately” and “about” may include the target value.

Also, the phraseology and terminology used herein is for the purpose of description and should not be regarded as limiting. The use of “including,” “comprising,” or “having,” “containing,” “involving,” and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

The invention claimed is:

1. An ear-worn device, comprising:

control circuitry configured to activate a speech mode of the ear-worn device or to activate a traditional mode of the ear-worn device, wherein the speech mode comprises neural network-based noise reduction and the traditional mode does not comprise neural network-based noise reduction;

noise reduction circuitry comprising neural network circuitry configured to perform the neural network-based noise reduction;

digital processing circuitry comprising wide dynamic range compression (WDRC) circuitry; and speech boost circuitry comprising an input and an output; wherein:

based on the control circuitry activating the speech mode, the control circuitry is configured to control:

the noise reduction circuitry to perform the neural network-based noise reduction on an audio signal received by the noise reduction circuitry using the neural network circuitry; and the speech boost circuitry to automatically increase a volume of the audio signal at its output relative to the volume of the audio signal at its input, wherein the increase in the volume is in addition to any amplification applied by the WDRC circuitry; and based on the control circuitry activating the traditional mode, the control circuitry is configured to control:

the noise reduction circuitry to cease to perform the neural network-based noise reduction on the audio signal received by the noise reduction circuitry; and the speech boost circuitry to cease to automatically increase the volume of the audio signal at its output relative to the volume of the audio signal at its input.

2. The ear-worn device of claim 1, wherein the digital processing circuitry is coupled between the noise reduction circuitry and the speech boost circuitry, or the speech boost circuitry is coupled between the noise reduction circuitry and the digital processing circuitry.

3. The ear-worn device of claim 1, wherein the increase in volume applied by the speech boost circuitry is independent of a user-controllable dedicated volume input.

4. The ear-worn device of claim 1, wherein the increase in volume applied by the speech boost circuitry is not controlled by any dedicated manual volume control on the ear-worn device nor by any dedicated manual volume control on a processing device in operative communication with the ear-worn device.

5. The ear-worn device of claim 1, wherein the control circuitry is configured to control the speech boost circuitry to automatically increase the volume of the audio signal at its output relative to the volume of the audio signal at its input by a speech boost amount, wherein the speech boost amount is an amount of the neural network-based noise reduction multiplied by a constant.

6. The ear-worn device of claim 1, wherein the control circuitry is configured to control the speech boost circuitry to automatically increase the volume of the audio signal at its output relative to the volume of the audio signal at its input by a speech boost amount, wherein the speech boost amount is an amount of the neural network-based noise reduction multiplied by a constant, minus an estimate of tip attenuation.

7. The ear-worn device of claim 1, wherein the control circuitry is configured to control the speech boost circuitry to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater.

8. The ear-worn device of claim 1, wherein the control circuitry is configured to control the speech boost circuitry to automatically increase the volume of the audio signal at its output relative to the volume of the audio signal at its input by a speech boost amount, wherein the speech boost amount is either (1) a prescribed WDRC gain in quiet, or (2) an amount of the neural network-based noise reduction multiplied by a constant, whichever is greater, minus an estimate of tip attenuation.

9. The ear-worn device of claim 1, wherein;

the control circuitry further comprises environmental monitoring circuitry;

the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount, wherein the speech boost amount is larger in a louder environment and smaller in a quieter environment.

10. The ear-worn device of claim 1, wherein:

the control circuitry further comprises environmental monitoring circuitry;

the control circuitry is further configured to use the environmental monitoring circuitry to estimate a direct path noise level; and the control circuitry is configured to control, based on the estimated direct path noise level, the speech boost circuitry to automatically increase the volume of the audio signal at its output relative to the volume of the audio signal at its input by a speech boost amount, wherein the speech boost amount is smaller in a louder environment and larger in a quieter environment.

11. The ear-worn device of claim 1, wherein:
the control circuitry further comprises environmental monitoring circuitry;
the control circuitry is further configured to use the environmental monitoring circuitry to estimate a direct path noise level and a direct path speech level; and
the control circuitry is configured to control, based on the estimated direct path noise level and the estimated direct path speech level, the speech boost circuitry to automatically increase the volume of the audio signal at its output relative to the volume of the audio signal at its input by a speech boost amount, wherein the speech boost amount is larger in a lower SNR environment and smaller in a higher SNR environment.

12. The car-worn device of claim 1, wherein:
the control circuitry further comprises environmental monitoring circuitry;
the control circuitry is further configured to use the environmental monitoring circuitry to estimate a direct path noise level and a direct path speech level; and
the control circuitry is configured to control, based on the estimated direct path noise level and the estimated direct path speech level, the speech boost circuitry to automatically increase the volume of the audio signal at its output relative to the volume of the audio signal at its input by a speech boost amount, wherein the speech boost amount is smaller in a lower SNR environment and larger in a higher SNR environment.

13. The car-worn device of claim 1, wherein:
the control circuitry further comprises environmental monitoring circuitry;
the control circuitry is further configured to use the environmental monitoring circuitry to estimate an environmental SNR; and
the control circuitry is configured to control, based on the estimated SNR, the speech boost circuitry to automatically increase the volume of the audio signal at its output relative to the volume of the audio signal at its input by a speech boost amount, wherein the speech boost amount is larger in a lower SNR environment and smaller in a higher SNR environment.

14. The car-worn device of claim 1, wherein:
the control circuitry further comprises environmental monitoring circuitry;
the control circuitry is further configured to use the environmental monitoring circuitry to estimate an environmental SNR; and
the control circuitry is configured to control, based on the estimated SNR, the speech boost circuitry to automatically increase the volume of the audio signal at its output relative to the volume of the audio signal at its input by a speech boost amount, wherein the speech boost amount is smaller in a lower SNR environment and larger in a higher SNR environment.

15. The ear-worn device of claim 1, wherein;
the control circuitry further comprises environmental monitoring circuitry;
the control circuitry is further configured to use the environmental monitoring circuitry to estimate a direct path noise level; and
the control circuitry is configured to control, based on the estimated direct path noise level, the speech boost circuitry to automatically increase the volume of the audio signal at its output relative to the volume of the audio signal at its input by a speech boost amount such that a speech component of the audio signal at its output is at least a certain amount louder than the estimated direct path noise level.

16. The ear-worn device of claim 1, wherein the control circuitry is configured to control the speech boost circuitry to amplify volume equally across all frequencies within an operating range of the device.

17. The ear-worn device of claim 1, wherein the control circuitry is configured to control the speech boost circuitry to implement a constant increase in insertion gain across all frequencies within an operating range of the device.

18. The ear-worn device of claim 17, wherein the control circuitry is configured to control the speech boost circuitry to add more gain in low frequencies than at high frequencies.

19. The ear-worn device of claim 17, wherein the control circuitry is configured to control the speech boost circuitry to add a first gain in a first frequency range and a second gain in a second frequency range, wherein the first gain is higher than the second gain and the first frequency range is at lower frequencies than the second frequency range.

20. The car-worn device of claim 1, wherein:
the control circuitry is configured to control the speech boost circuitry to automatically increase the volume of the audio signal at its output relative to the volume of the audio signal at its input by a first speech boost amount at a first time;
the control circuitry is configured to control the speech boost circuitry to automatically increase the volume of the audio signal at its output relative to the volume of the audio signal at its input by a second speech boost amount at a second time; and
a difference between (1) a gain of a speech component of the audio signal from an input of the noise reduction circuitry to the output of the speech boost circuitry, and (2) a gain of a noise component of the audio signal from the input of the noise reduction circuitry to the output of the speech boost circuitry, is the same at the first and second times.

21. The ear-worn device of claim 1, wherein the control circuitry is configured:
to receive input indicating a selected speech boost amount; and
to control the speech boost circuitry to automatically increase the volume of the audio signal at its output relative to the volume of the audio signal at its input by the selected speech boost amount.

22. The ear-worn device of claim 1, wherein the control circuitry is configured to activate the speech mode or to activate the traditional mode based on receiving input indicating a selection of the speech mode or the traditional mode.

23. The ear-worn device of claim 22, wherein the control circuitry is configured to receive the input based on a wearer pressing a button on the ear-worn device.

24. The car-worn device of claim 22, wherein the ear-worn device is part of a system that comprises a physical, manual volume control that is different from the button.

25. The ear-worn device of claim 22, wherein the control circuitry is configured to receive the input based on selection of an option displayed on a processing device in operative communication with the ear-worn device.

26. The ear-worn device of claim 25, wherein the processing device further displays a manual volume control that is different from the option.

27. The ear-worn device of claim 1, wherein the control circuitry is configured to activate the speech mode or to activate the traditional mode based on computed metrics characterizing an acoustic environment.

28. The ear-worn device of claim 27, wherein the computed metrics characterizing the acoustic environment comprise signal-to-noise ratio (SNR).

* * * * *